July 11, 1967 A. D. BETZ ET AL 3,331,055

DATA COMMUNICATION WITH MATRIX SELECTION OF LINE TERMINALS

Filed June 1, 1964 12 Sheets-Sheet 1

INVENTORS
ALLEN D. BETZ
WALLACE E. WEISMANTEL
BY Thomas J. Nikolai
ATTORNEY

July 11, 1967 A. D. BETZ ET AL 3,331,055

DATA COMMUNICATION WITH MATRIX SELECTION OF LINE TERMINALS

Filed June 1, 1964 12 Sheets-Sheet 6

July 11, 1967 A. D. BETZ ET AL 3,331,055

DATA COMMUNICATION WITH MATRIX SELECTION OF LINE TERMINALS

Filed June 1, 1964 12 Sheets-Sheet 11

OUTPUT SYNC. CLT'S 3,331,055
DATA COMMUNICATION SYSTEM WITH MATRIX SELECTION OF LINE TERMINALS
Allen D. Betz, Rosemount, and Wallace E. Weismantel, St. Paul, Minn., assignors to Sperry Rand Corporation, New York, N.Y., a corporation of Delaware
Filed June 1, 1964, Ser. No. 371,321
23 Claims. (Cl. 340—172.5)

ABSTRACT OF THE DISCLOSURE

This disclosure relates to a data communication system which provides for the input or output multiplexing of communication lines to a computer imput/output channel on a time-sharing basis. A system of primary select circuits and secondary select circuits are described, whereby the highest priority group is selected and the highest priority input/output device within the group is selected. Also described are circuits for converting parallelly received data signals to a serial output form, and circuits for converting serially received data signals to a parallel output form without the need for external counter circuits, by utilizing marker pulses.

The present invention relates generally to digital data processing equipment, and more specifically to an improved arrangement for transferring data between a digital computer and its associated peripheral equipment. The invention provides for input/output multiplexing of telephonic or telegraphic lines to a computer input/output channel on a time-sharing basis.

In real-time communication systems employing digital data processing equipment, a computer is utilized to perform operations on the digital data which may be supplied to it from a plurality of stations. At each of these stations equipment is located, capable of feeding the digital data into the computer and of receiving the data from the computer after it has performed its operations on the data. In a real-time communication system, the processing of data takes place substantially in synchronism with a physical process in such a fashion that the results of the data processing become immediately useful to the physical operation. Because some information coming from various remote locations may be considered more important than that coming from other remote stations, the system should provide some means of establishing priority between the various connected remote systems. The present invention provides a real-time communication system wherein the communication between a central computer and a plurality of remotely located external devices is, in part, controlled by a priority system.

Once the computer has established communication with an external device, there is no longer a need for the computer to maintain rigid control on this communication. The computer should be free to perform its high speed operation on data that had previously been received and stored in the computer memory. The computer need only be required to note when the external device has finished transmitting to or receiving its data from the computer. Once the data has been completely received or completely transmitted, the communication should be able to be automatically terminated. This invention provides a communication system wherein the communication between the central computer and the peripheral device is self-running and self-terminating.

Since the present communication subsystem is designed to be compatible with Data Sets used with telephonic and telegraphic facilities which normally utilizes data in serial form, means are provided for converting the serial data into parallel data for use in a computer and for converting parallel data from the computer into serial form for transmission to the telephonic and telegraphic data equipment. The usual method of converting parallel data to serial form and serial data to parallel form is to have a register capable of shifting and a counter to keep track of the number of shifts. The method and apparatus described in this disclosure eliminates the need for a counter.

It is an object of this invention to provide a new and unique method and apparatus for converting parallel data to serial form and serial data to parallel form without the need for an external counter.

It is also an object of the present invention to provide a real-time communication system wherein the communication between a central computer and a plurality of remotely located external devices is controlled by a priority system.

Still another object of this invention is to provide a communication system wherein the communication between the central computer and the peripheral device is self-running and self-terminating.

It is a further object of this invention to provide a communication system between a computer and an external device wherein the reception or transmission of data by the external device is timed either by start-stop pulses or synchronizing characters decoded by the external device.

It is another object of this invention to provide a communication system between a computer and a plurality of external devices wherein an external device desiring to receive from or transmit to the computer identifies itself and instructs the computer where in its memory it should store or search for data.

It is also an object of this invention to provide a communication system between a computer and a plurality of peripheral devices wherein a multiplexer will select one of the peripheral devices according to priority and will inform the computer if the peripheral device is requesting output from or input to the computer.

It is still another object of this invention to provide a communication system between a computer and a plurality of peripheral devices wherein the same lines are used to transmit both commands and data to the peripheral device.

The following abbreviations in Table I are used throughout the disclosure.

TABLE I

| Signal or Unit | Abbrev. | From | To | Function or Purpose |
|---|---|---|---|---|
| Externally Specified Index | ESI | C/M | Computer | Operate in ESI mode. |
| Input Data Request | IDR | C/M | do | There is data on the input line. Will you accept? |
| Input Acknowledge | IA | Computer | CLT | I have stored the data. You may drop your request. |
| Service Request | (None) | CLT | C/M | Primary Request and a Secondary Request. |
| Output Data Request | ODR | C/M | Computer | The output CLT is ready to receive data. |
| Output Acknowledge | OA | Computer | CLT | Here is the data. |
| External Function Word | EFW | do | CLT | Tells "who" to do "what." |
| 3 out of 7 Code | 3-of-7 | do | CLT | A combination of 3 of 7 possible bits combination of which identifies a particular CLT. Tells "who". |
| External Function | EF | do | CLT | Says "do it now". In effect it is the "when." |
| SEND | (None) | do | CLT | Tells "what" to do. A command. |
| Look-For-Synch | LFS | do | CLT | Tells "what" to do. A command. |
| Primary Request | PR | CLT | C/M | Will you select me to communicate with the Computer? |
| Primary Select | PS | C/M | CLT | I have selected your row because it has the highest priority. |
| Secondary Request | SR | CLT | C/M | Will you select me? |
| Secondary Select | SS | C/M | CLT | I have selected you. |
| End of Transmission | EOT | Computer | CLT | Stop sending data. |
| Remote Release | RR | do | CLT | Used in automatic dialing systems to terminate phone calls. |
| Request to Send | RTS | CLT | Data Set | Are you ready to receive data? |
| Clear to Send | CTS | Data Sets | CLT | I am ready to receive data from you. |
| Serial Clock Receive | SCR | Data Set | CLT | Provides clock pulses for receiving data. |
| Serial Clock Transmit | SCT | do | CLT | Provides clock pulses for transmitting data. |
| Communications Multiplexer | C/M | | | Selects Highest Priority CLT. |
| Communication Line Terminal | CLT | | | Processes data from or to computer. |
| Data Sets | (None) | | | Accepts data from or sends data to the CLT in serial form. |
| Enable Input Clock | EIC | | | Start the input clock. |
| Primary Priority Request Network | PPR | | | The unit in the C/M that determines which row of CLT's requesting service has the highest priority. |
| Secondary Priority Network | SPR | | | The unit in the C/M that determines which CLT in the selected row has the highest priority. |
| Enable Output Clock | EOC | | | Start the output clock. |
| Phase one | $\phi$ 1 | | | Clock pulse. |
| Phase two | $\phi$ 2 | | | Do. |

As previously stated, the purpose of the present invention is to provide for the input/output multiplexing of telephonic or telegraphic lines to a computer input/output channel on a time sharing basis. Thus, the computer forms no part of the present invention. However, a brief description of its modes of operation will be necessary for a complete understanding of the present invention.

The digital computer employed with this system is designed to operate in any one of three possible data transfer modes. The first mode is termed the Internally Specified Index mode (ISI), the second mode is termed the Externally Specified Index mode (ESI), and the third mode is termed the Externally Specified Address mode (ESA). Primary consideration is given to the operation of the computer in the ESI mode, since it will operate in this mode with the system of the present invention. It is called the ESI mode of operation because the external or peripheral device specifies an "index" word which is used to tell the computer where in its memory to store the data on an input operation or where to take the data from on an output operation. The purpose of the ESI mode of operation is to enable the computer to communicate with a large number of peripheral devices connected to a single/output channel of the computer. In this mode, when a peripheral device desires to transmit a word of data to the computer, it presents the data word to the computer along with a control signal termed an Input Data Request (IDR). The lower half of this data word contains the index identifier for accessing a particular index word stored in the computer memory. The upper half of the data word contains the information to be placed in the computer memory. Each peripheral device has its own index word identifier. When the computer notes the presence of a signal on the Input Data Request (IDR) line, it is advised that a peripheral device on this channel wishes to transfer information to the computer along its data lines. After the computer has responded to this request, referenced and incremented the index word, and accepted the data from the peripheral device and stored it in its memory section, it sends out a signal (termed an Input Acknowledge (IA) signal) along a control line. This signal advises the data handling device that the computer has accepted that data and that new information can henceforth be placed on the input data lines.

When a computer desires to select a particular output device for the transfer of information, this device is selected by means of an External Function Word (EFW) which is sent to the peripheral equipment on the output data line. The EFW uses the same lines as the data words but is distinguished from data words by the computer activating an External Function (EF) control line. Thus, data on the output data lines plus an EF signal indicates to the output device that it is receiving a command (an EFW plus an EF control signal). Data plus an Output Acknowledge (OA) signal indicates to the output device that data is to be forwarded (data plus an OA). The particular signals are then translated into a discrete set of actions by the peripheral device.

When the data handling device connected to the output channel of the computer receives a SEND command signal, i.e. EFW data plus an EF signal from the computer, it sends a signal to a multiplexer which presents an ESI Word and an Output Data Request (ODR) signal to the computer on a control line. Detecting the presence of the ODR signal, the computer references and increments the index word specified by the ESI word, takes the information from its memory storage unit, and places it on the output data lines. It then places a signal on the Output Acknowledge (OA) line to inform the peripheral device that data is on the line ready for sampling. The peripheral equipment then detects this OA signal and samples the data lines to accept the data word. After acceptance, the peripheral device drops its Primary and Secondary Requests and the multiplexer drops the ODR signal.

These and other more detailed and specific objects will be disclosed in the course of the following specification, reference being had to the accompanying drawings, in which.

Figure 4:
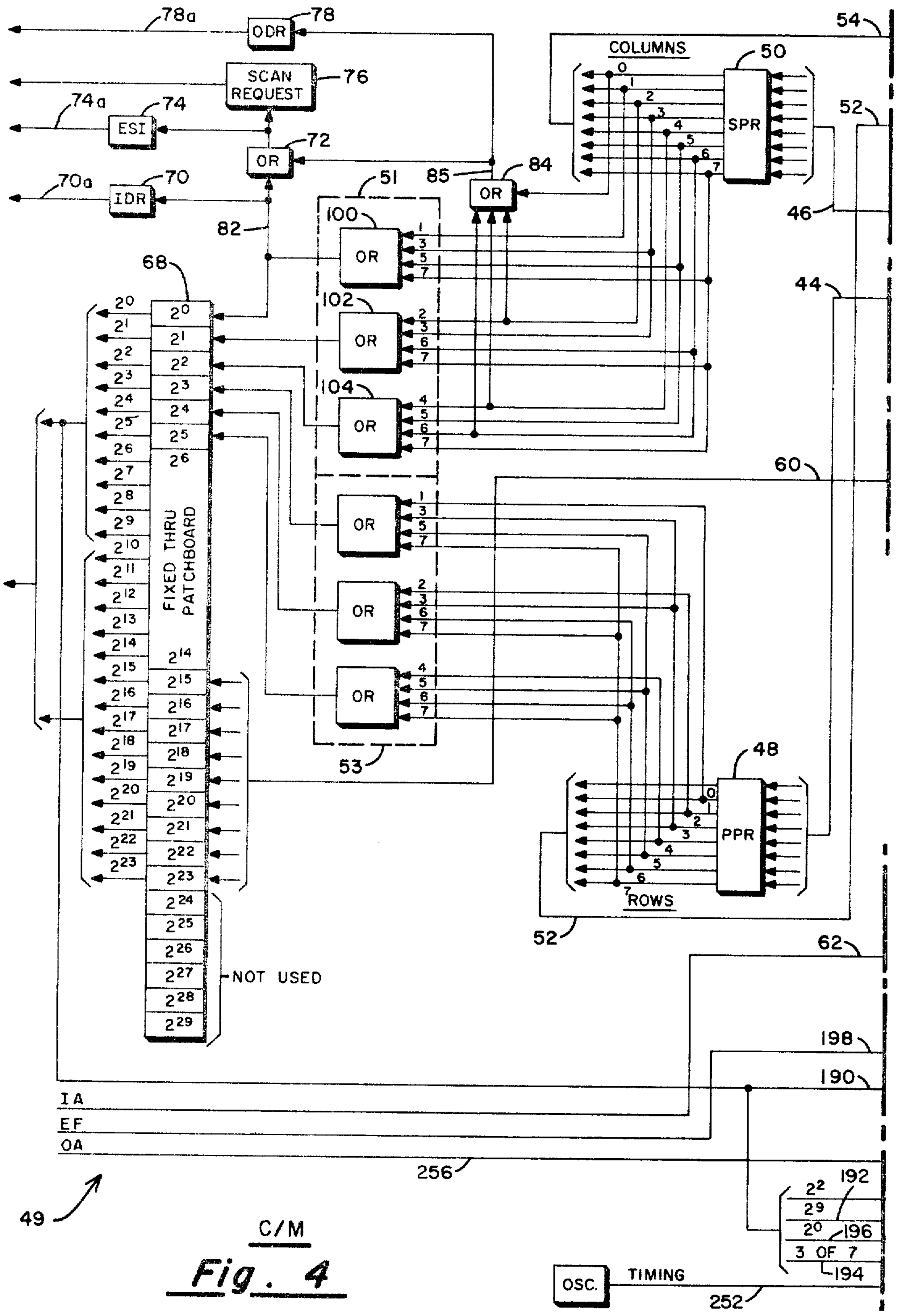
Figure 5:
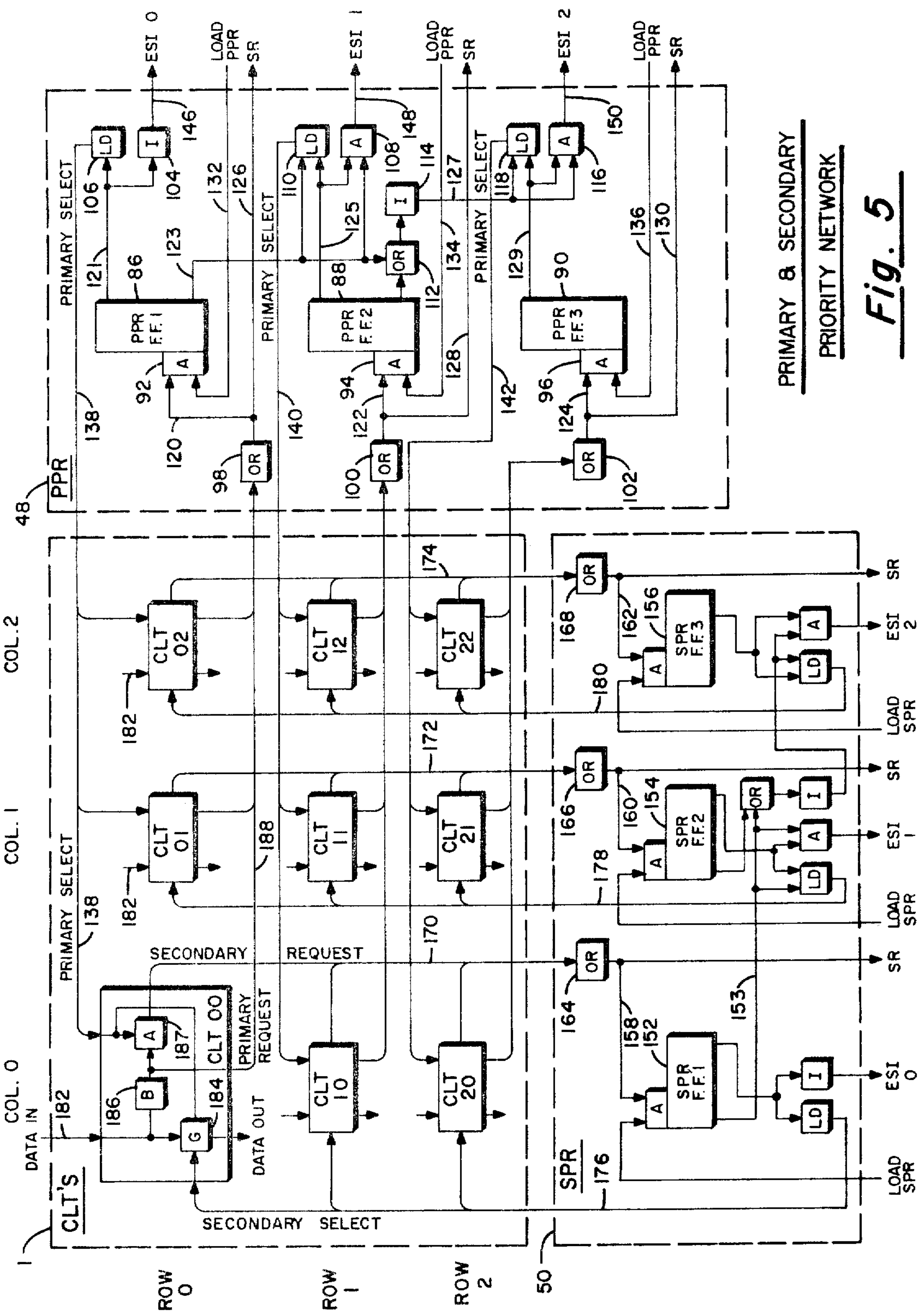
Figure 7:
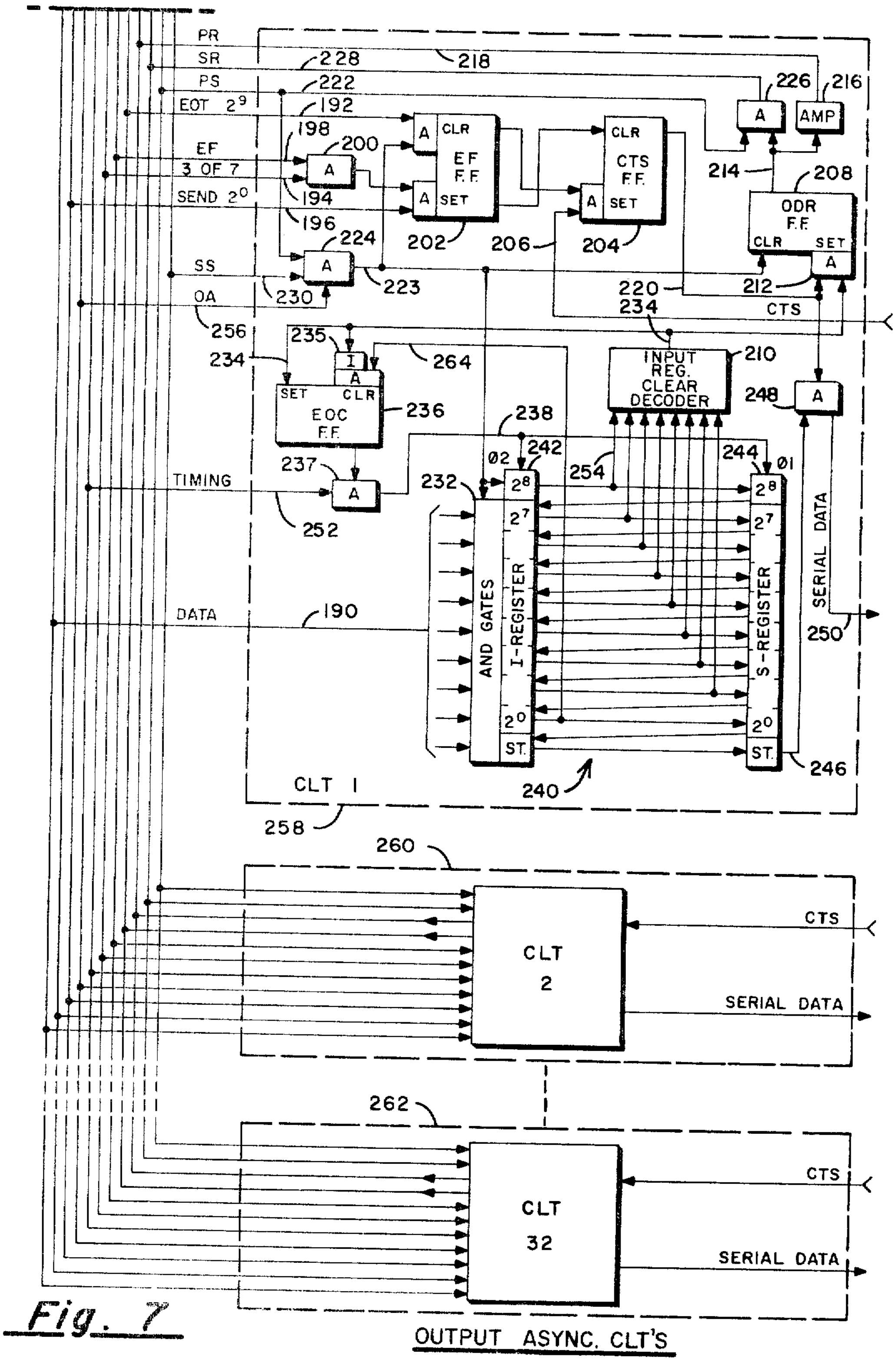
Figure 8:
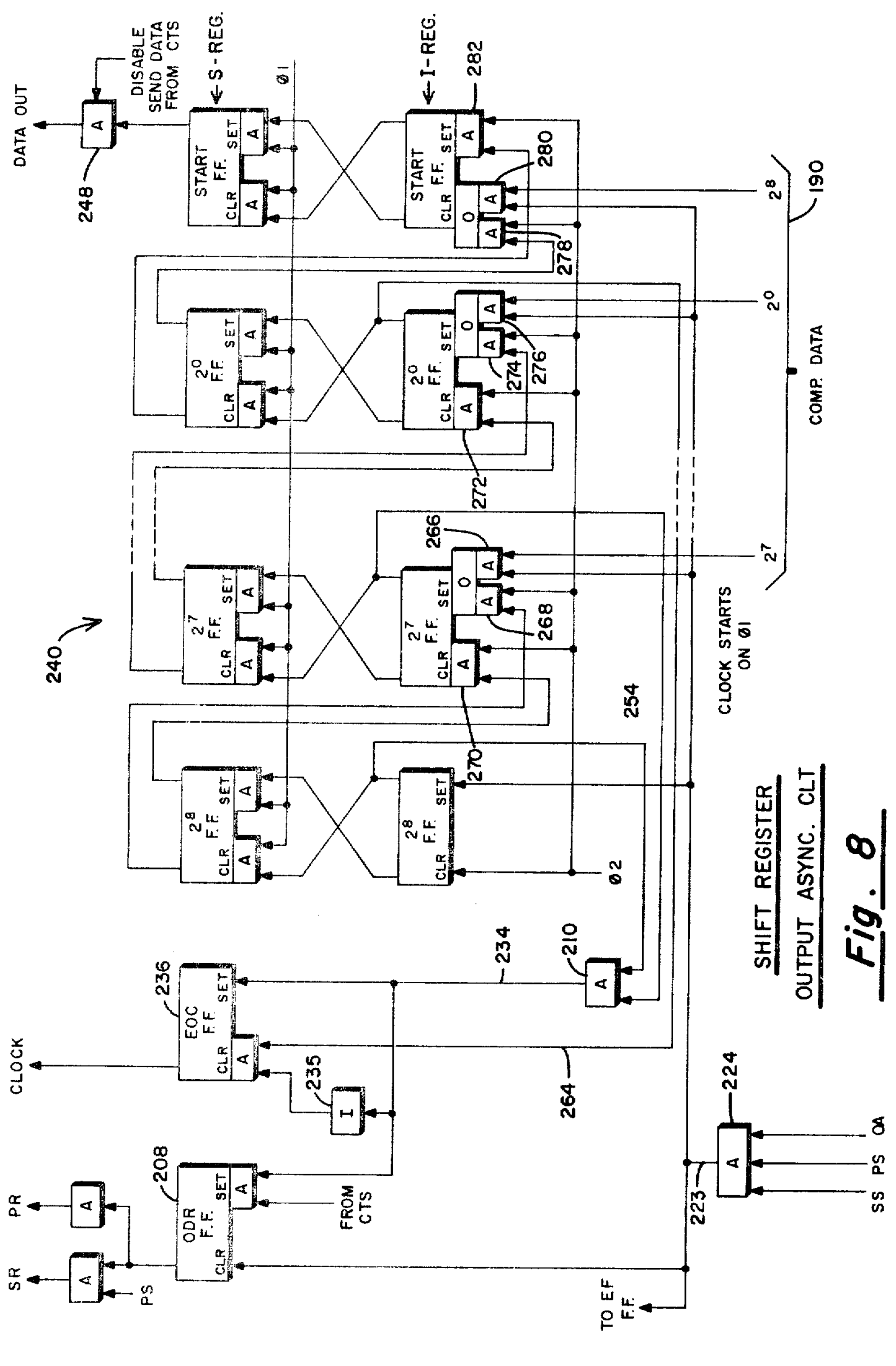
Figure 9:
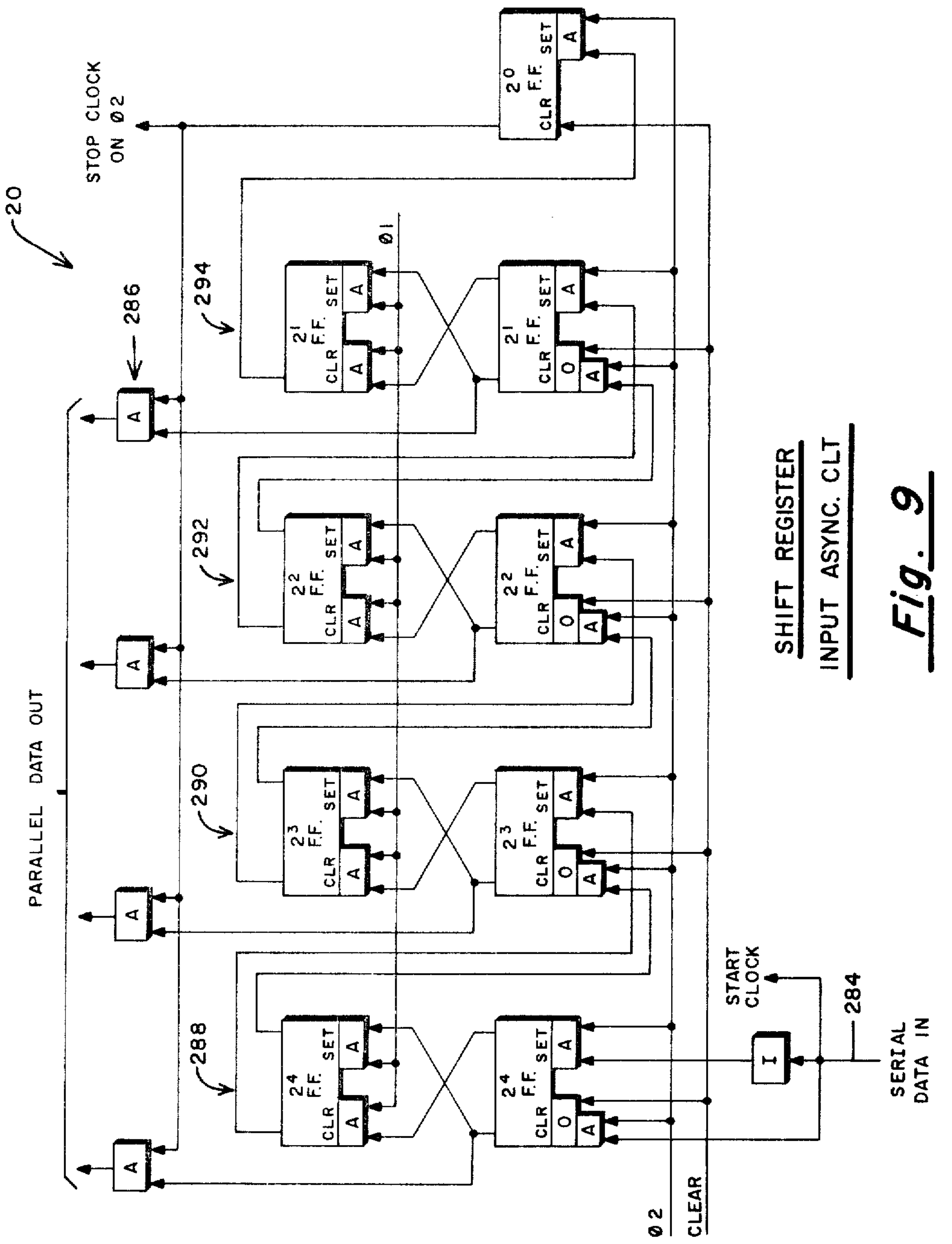
Figure 10:
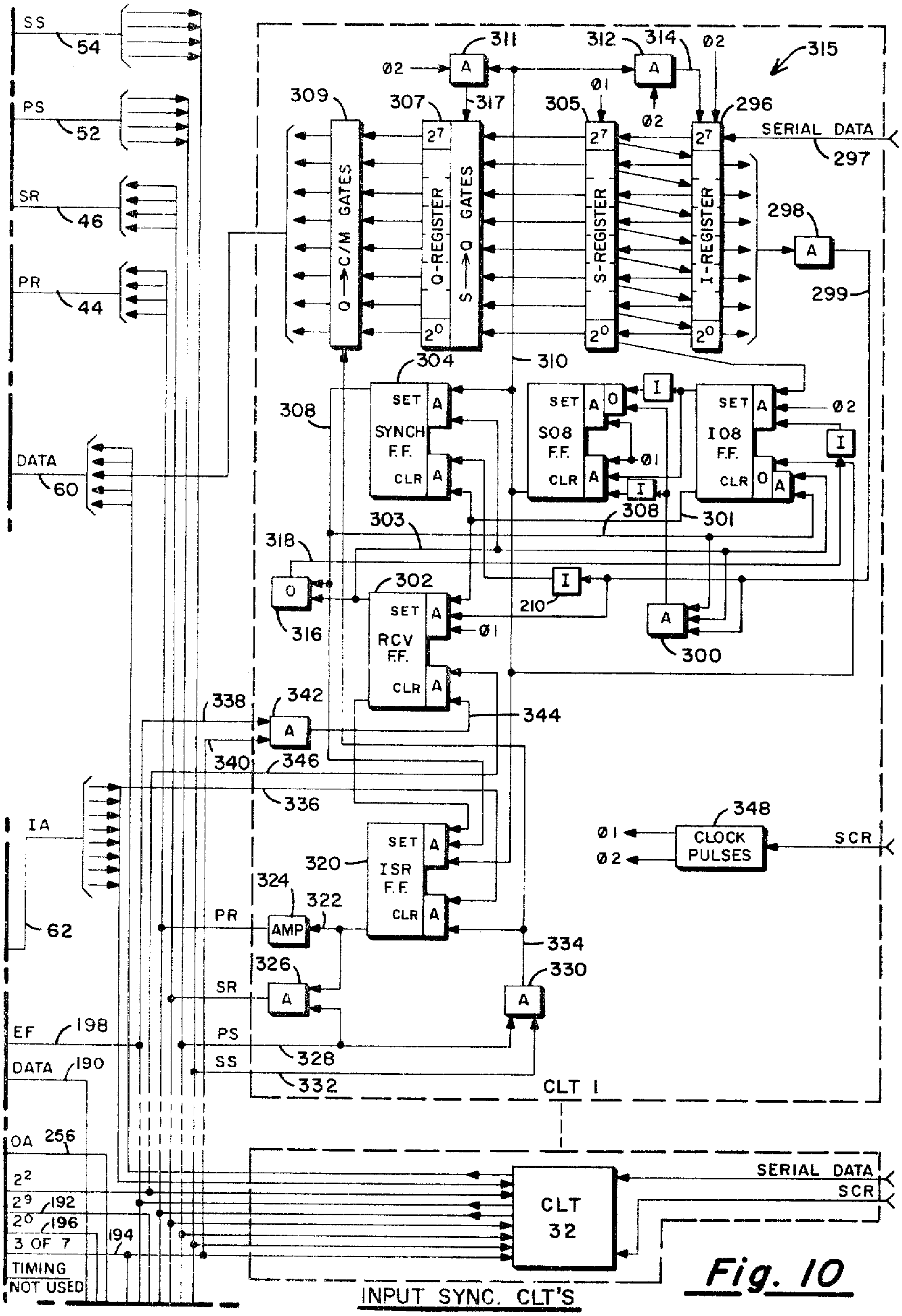
Figure 11:
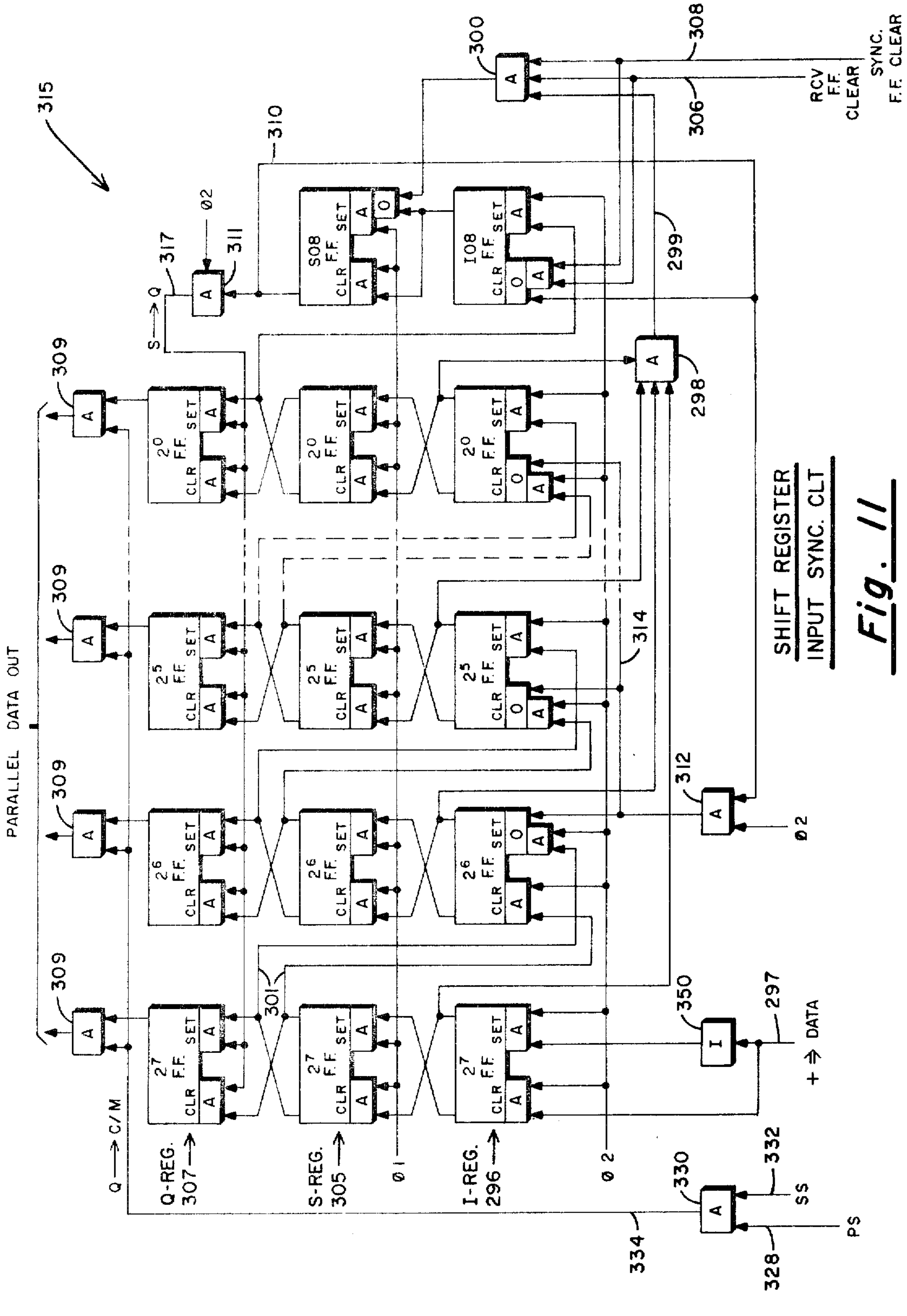
Figure 12:
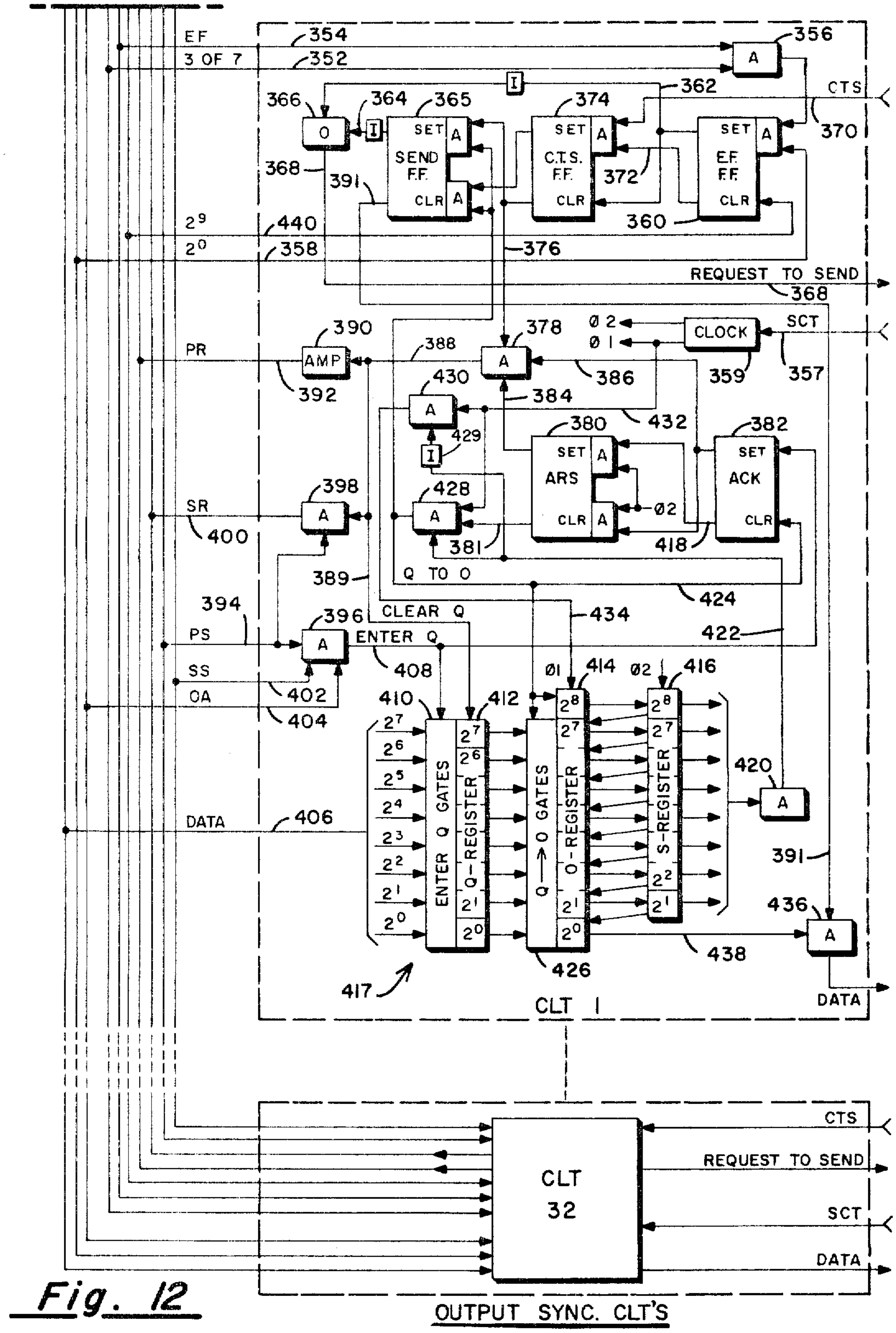
Figure 13:
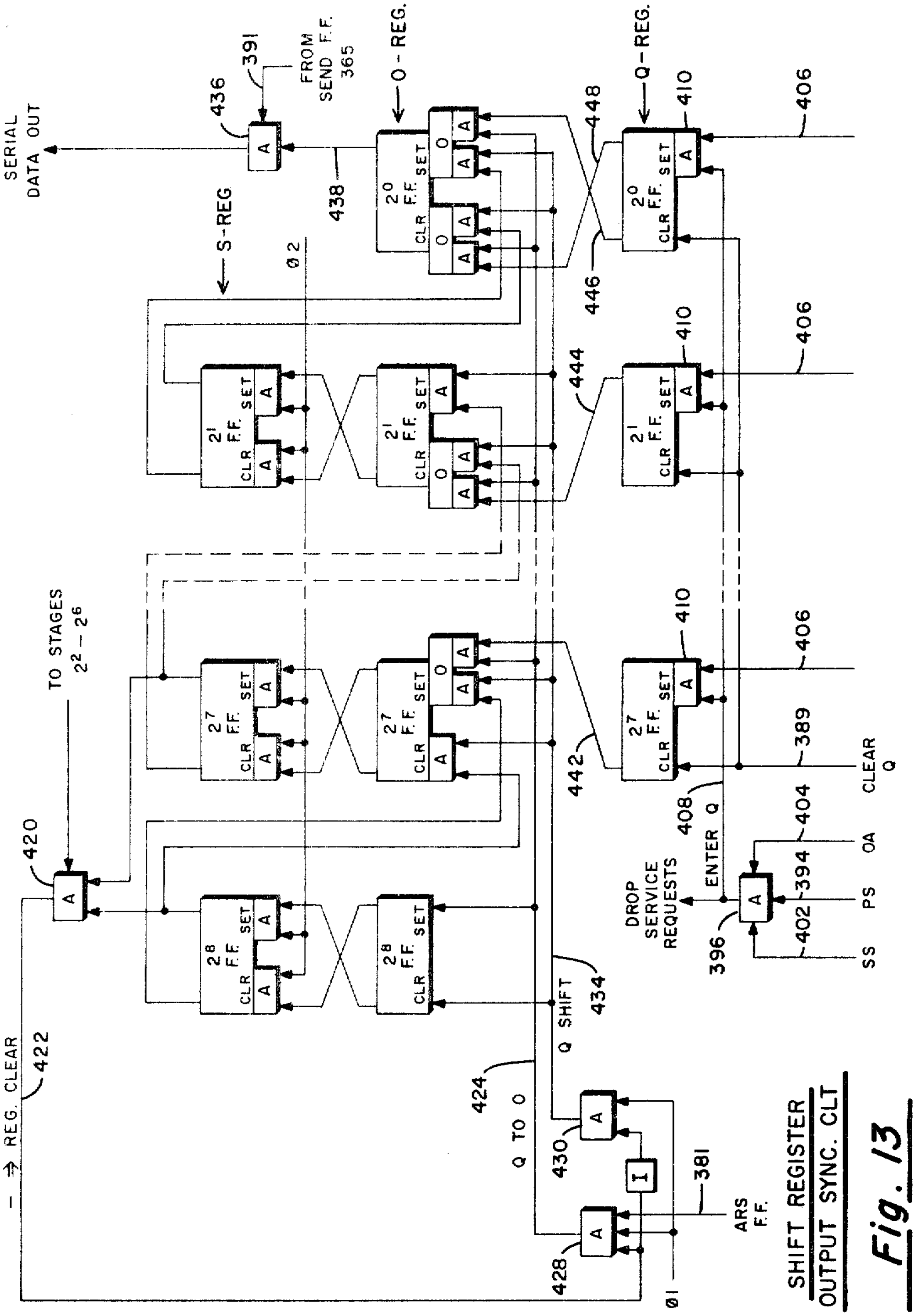

Line Terminals with the control circuitry of an exemplary unit shown in detail;

FIG. 4 is a block diagram of the inventive priority network contained in the subsystem multiplexer;

FIG. 5 discloses the priority network embodied in the multiplexer;

FIG. 6 is a diagram of the bit utilization of the computer data lines;

FIG. 7 is a block diagram of the output Communication Line Terminal with the control circuitry of an exemplary unit shown in detail;

FIG. 8 is a detailed showing of the operation of the shift register of the low speed output asynchronous Communication Line Terminal;

FIG. 9 is a detailed showing of the operation of the shift register in a low speed input asynchronous Communication Line Terminal;

FIG. 10 is a block diagram of the control circuitry of an exemplary synchronous Input Communication Line Terminal;

FIG. 11 is a detailed block diagram showing the novel shift register employed in the synchronous Input Communication Line Terminal;

FIG. 12 is a block diagram of the control circuitry of an exemplary synchronous output Communication Line Terminal; and FIG. 13 is a detailed showing of the operation of the novel shift register in the synchronous Output Communication Line Terminal.

Figure 14:
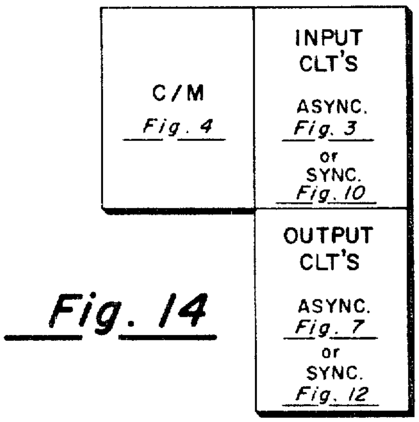

FIG. 14 shows the manner in which FIG. 4 may be connected to FIGS. 3 and 7 or 10 and 12 to form a complete diagram.

The Communications Subsystem consists of a Communication Multiplexer (C/M) and various input/output Communication Line Terminals (CLT's) designed to be compatible with telephonic and telegraphic data equipment hereinafter called Data Sets.

The C/M is a device which can handle a plurality of input/output CLT's, for instance 64, and controls the transfer of data and control lines between the CLT's and a computer input/output channel.

The CLT's are input/output devices which provide the terminal connections between the Data Sets and the computer via the C/M.

It may be well at this point to emphasize that the Communication Line Terminals may be either synchronous or asynchronous. The asynchronous type of CLT, both input and output, require the use of start and stop bits for their operation. However, the synchronous type of CLT requires the reception of two synch characters back-to-back before the units will receive and process data.

Consider now the chain of events in an output data transfer wherein data is transferred from the computer through the C/M and the CLT to the data sets on the output lines. The computer initiates the sequence of events by sending a command consisting of an External Function Word (EFW) accompanied by an EF control signal instructing the CLT to go into the SEND mode. The CLT then presents a Service Request signal to the Communications Multiplexer (C/M). The Service Request signal consists of a Primary Request (PR) and a Secondary Request signal (SR). The C/M then locks on to the highest priority CLT requesting service and sends an Output Data Request (ODR) signal and an ESI signal to the computer. The CLT drops its service request signal upon receipt of the data and an Output Acknowledge (OA) from the computer. This process is repeated (except for the External Function command) until the output CLT receives an End of Transmission (EOT) bit in the last character of the output message. This procedure holds true for each of the output CLT's described herein.

Consider also the chain of events in an input data transfer from an asynchronous CLT. The input CLT presents a Service Request signal to the C/M upon receipt of a character from the input data lines. The C/M then locks on to the highest priority CLT requesting service, and sends an Input Data Request (IDR) signal and an ESI signal to the computer. The CLT drops its Service Request signal upon receiving an Input Acknowledge (IA) signal from the computer. This (IA) signal signifies that the computer has accepted the data. This process is repeated as long as the input CLT receives valid data.

The synchronous input CLT operates as follows: The input CLT presents a Service Request signal to the C/M upon receipt of the first data character after two synch characters have been received back-to-back from the line. The C/M locks-on to the highest priority CLT requesting service and sends an IDR signal and an ESI signal to the computer. The CLT drops its Service Request signal upon receipt of an IA signal from the computer. This process is repeated until the computer sends an external function command to the input CLT instructing it to "Look for Synch." This function terminates the input process.

Figure 1:
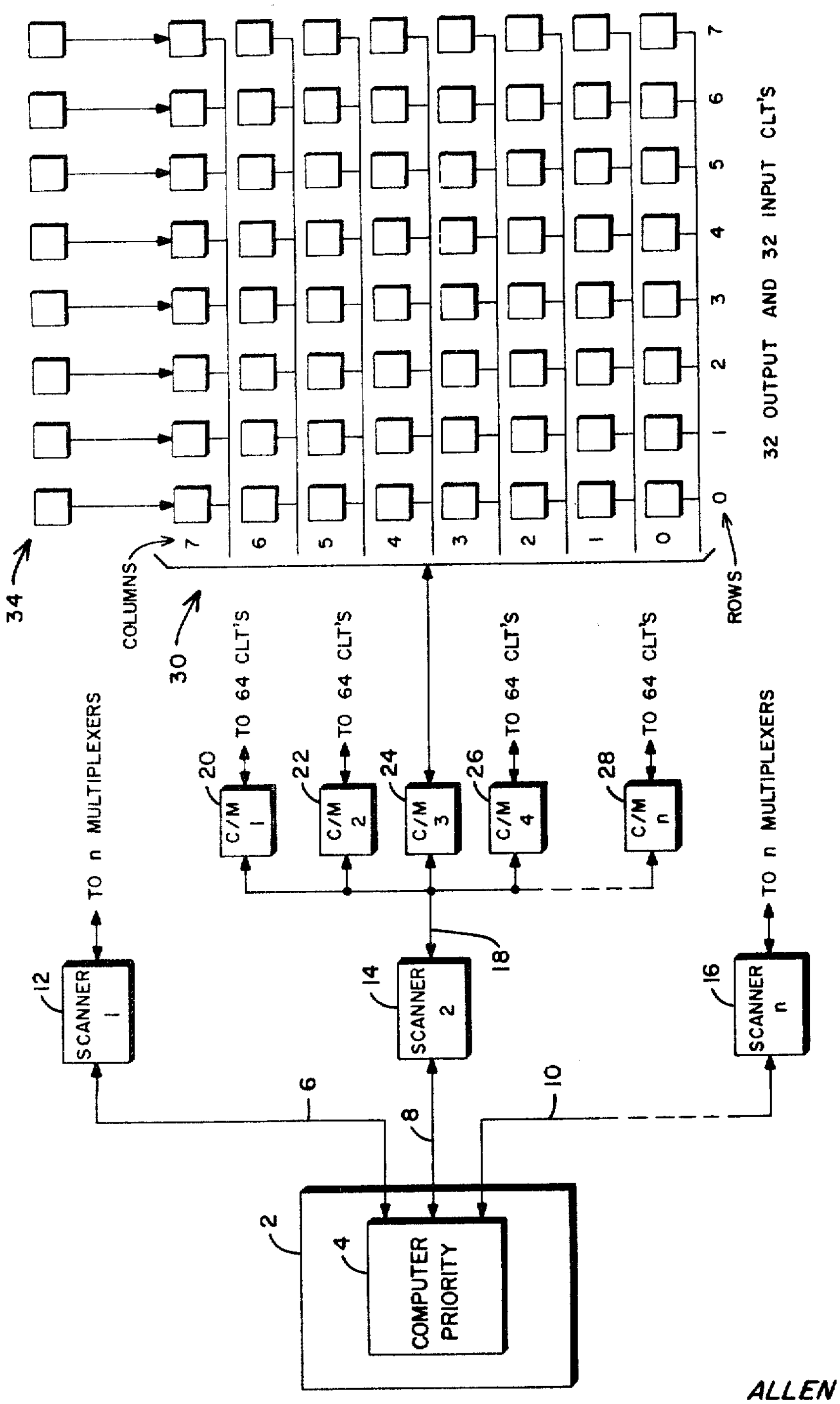
FIG. 1 is a block diagram of the inventive communication subsystem.

A block diagram of the inventive communications subsystem is shown in FIG. 1. A computer 2 is shown having "*n*" input/output channels one end of each of which is connected to a priority network 4 in the computer that determines which of the input/output channels has the highest priority and will be selected over the others. This priority network and the computer form no part of the present invention and are shown merely to illustrate the entire system. Further, the input/output channels from the computer are shown connected to scanner selectors 1 through *n*. Each of the scanner selectors 12, 14 and 16 are connected to "*n*" multiplexers and such connection is shown in the representation wherein "*n*" multiplexers 20–28 are connected via line 18 to scanner selector 14. The scanner selectors in general may be of any known type such as the type shown in U.S. Patent 3,104,332. Each of the multiplexers is connected to a plurality of input/output CLT's 30 and is shown, for example, in FIG. 1 to include 32 input CLT's and 32 output CLT's arranged electrically in 8 rows or first groups and 8 columns or second groups each consisting of eight CLT's. Each CLT is then connected to telephonic and/or telegraphic equipment represented by Data Sets 34 shown connected to the CLT's in column 7 only for simplification of the drawings.

Figure 2:
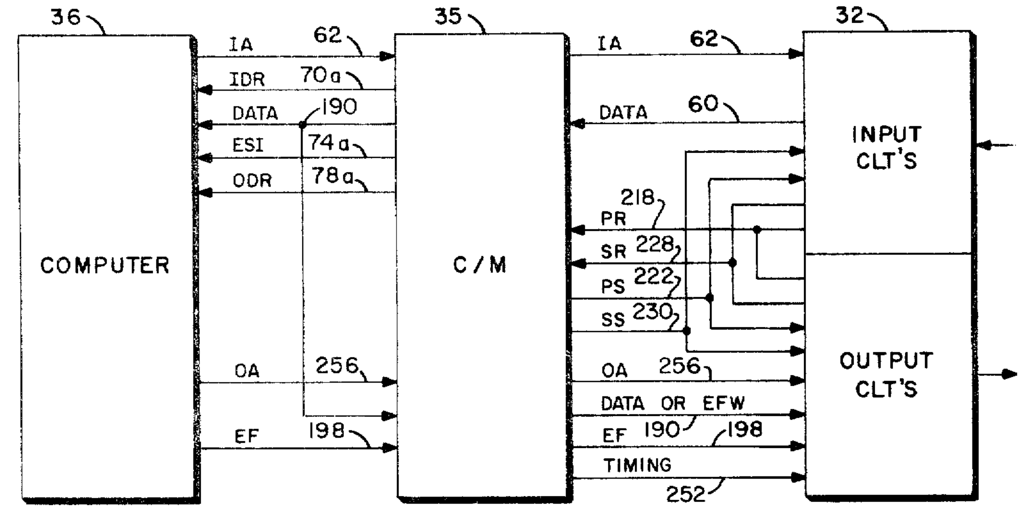
FIG. 2 is a block diagram indicating the control signals and their direction of flow between system units.

Consider next the block diagram of FIG. 2 showing the control signals for transferring input data via the communication subsystem. If the input CLT is of the asynchronous type, it accepts the input character bits in serial fashion and recognizes a Start bit which is received on the input line. If the CLT is of the synchronous type, it must recognize two distinct synch character words before it accepts the input data word bits serially. After each input data character is received and stored in a bit storage register, the CLT presents a Primary Request (PR) signal to the Communications Multiplexer (C/M) 35 by way of line 218. If there is more than one of the first groups of CLT's requesting service at the same time, the C/M selects the group of CLT's with the highest primary priority and returns a Primary Select (PS) signal to that group by way of line 222. Upon receipt of the PS signal, the CLT's in the selected group desiring service present a Secondary Request (SR) to the Communications Multiplexer via line 228. The C/M determines which of the CLT's in this group has the highest secondary priority and returns a secondary select (SS) to that CLT alone by way of line 230. Upon receipt of the SS signal, the selected CLT gates the data character in bit parallel form on the data lines 60 to the C/M. The C/M places the ESI signal on line 74*a* and Input Data Request (IDR) signal on line 70*a* to the computer and also places the data character on line 190 to the computer. After the computer has accepted the data, it returns an Input Acknowledge (IA) signal to the C/M on line 62 which passes it on to the CLT. Upon receipt of the IA signal, the CLT drops the Service Request signal. This process is repeated for each character of input data.

Figure 3:
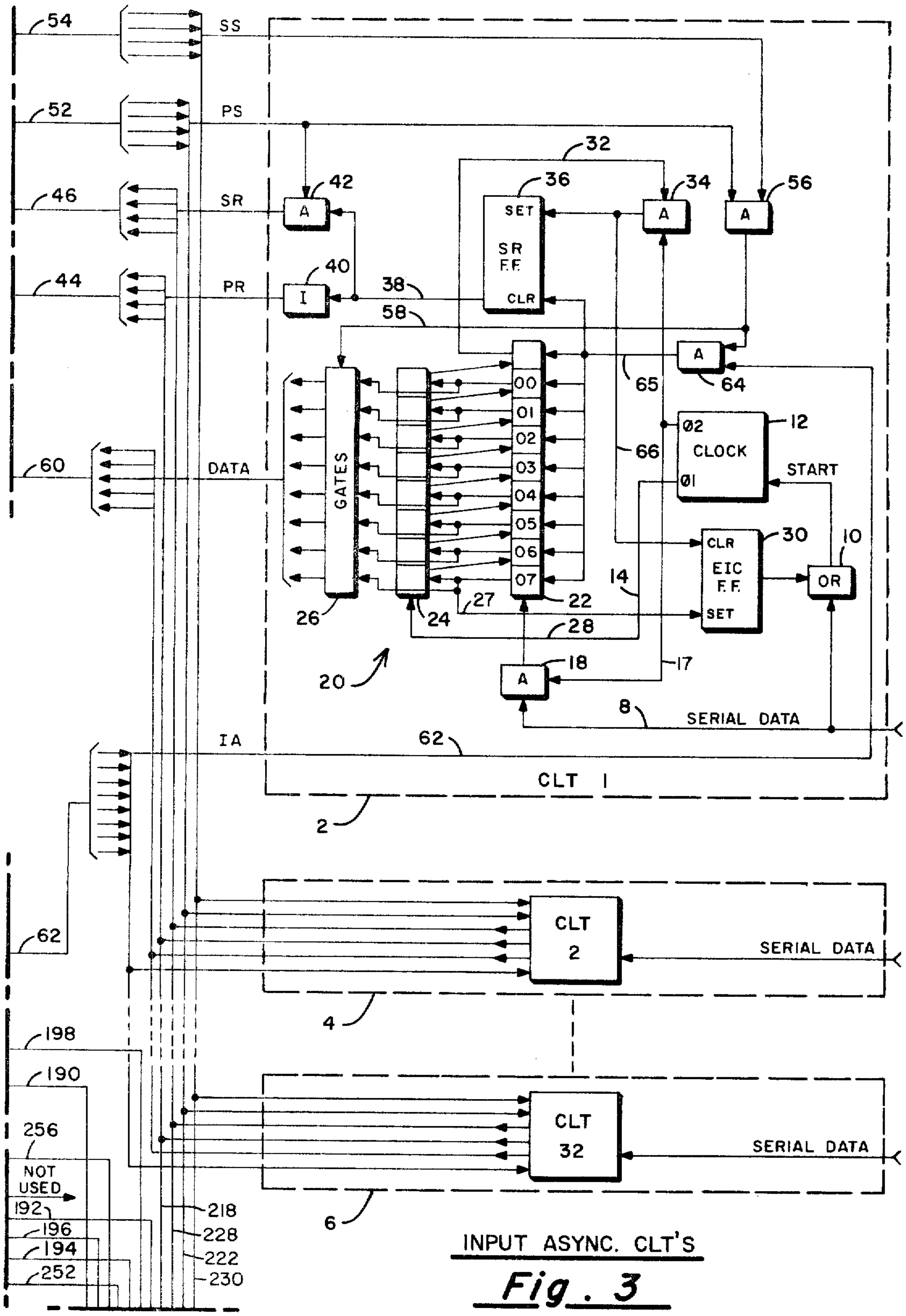
FIG. 3 is a block diagram of the input Communication

The output portion of FIG. 2 will be discussed later, but for now, consider the operation of the device in its input mode as shown in particular in FIGS. 3 and 4. Thirty-two Input CLT's are represented in FIG. 3 by blocks 2, 4 and 6. The CLT represented in block 2 is typical of the low speed input asynchronous type which requires Start and Stop bits for operation. Thus, the serial input data on line 8 includes a START bit which passes through OR gate 10 starting operation of two phase ($2\phi$) clock 12. On the second $\phi$ output of clock 12, a pulse from the clock is applied through line 17 to AND gate 18 allowing a data pulse to be applied to lower register 22 of shift register 20. If this data pulse is of the "runt pulse" type i.e. one whose width is shorter than half the normal bit width, it will not set stage O7 of register 22 and the $2-\phi$ clock will stop on the second $\phi$. However, if the pulse is a valid size pulse, stage O7 will be set and the output of stage O7 on line 27 will set the Enable Input Clock (EIC) flip-flop 30 which will pass a signal through OR gate 10 and which will continue to keep clock 12 operating until a STOP bit is received. On the following $\phi-1$, this pulse in stage O7 will be transferred to stage O7 of upper storage register 24. On each $\phi-2$ of the clock, an input data bit will be shifted into the first stage O7 of the lower storage register 22. Also, on each $\phi-2$ of the clock, each bit in the upper register 24 of shift register 20 will be shifted to the next stage of the lower register. Thus, on $\phi-2$ the data in stage O7 of the upper register will be shifted to stage O6 of the lower register, stage O6 of the upper register will be shifted to stage O5 of the lower register, etc. On each $\phi-1$ of the clock, the data in each lower statge will be transferred to the stage in the upper register 24. Thus, on each $\phi-1$ the data in stage O7 of the lower register will be shifted to stage O7 of the upper register. The data in stage O6 of the lower register will be shifted to stage O6 of the upper register. A more detailed description of the operation of shift register 20 will be given later. This operation will continue until the START bit exists from stage O of the lower register 22 on line 32. This START bit will pass through gate 34 on the second phase of clock 12 to set the Service Request flip-flop 36. The output of the Service Request flip-flop 36 on line 38 passes through the inverter 40 as a PR signal and following cable 44 it passes to the Primary Priority Request (PPR) network 48 in C/M 49 shown in FIG. 4. The PPR network 48 and the Secondary Priority Request (SPR) network 50 in C/M 49 electrically connect all input and output CLT's in a matrix of rows and columns as shown in FIG. 5 and as will be discussed more particularly later on in the specification. Also, the rows or first groups of CLT's are arranged in priority order and the individual CLT's in each row, each representing a different column or second group, are also arranged in priority order. One function of the PPR network 48 is to select the row of CLT's presenting a priority request which has the highest priority. It then returns a PS signal to each of the CLT's in that row on line 52. This PS signal in each of the CLT's in the selected row is applied first to a secondary request gate 42 and an "AND" gate 56. See FIG. 3. Because a PR and a PS signal are both present at gate 42, a Secondary Request (SR) is transmitted via line 46 to the Secondary Priority Request (SPR) network 50 in multiplexer 49. Thus, all of the CLT's in the selected row may transmit simultaneously Secondary Request signals to the SPR network 50. This priority network 50 determines which of the CLT's in the selected row presenting secondary requests has the highest priority and returns an SS signal on line 54 to that particular CLT only. Both the Primary and Secondary Select signals then combine to provide an output from AND gate 56 on line 58, opening gating amplifiers 26 thereby permitting the data in the lower register 22 to be gated via lines 60 to C/M 49. The same pulses which set flip-flop 36 passes via line 66 to clear EIC FF 30 to stop the clock operation. The computer returns an Input Acknowledge (IA) signal on line 62 as soon as it has sampled the data presented to it. The (IA) signal combines with the output of gate 56 to cause gate 64 to produce a signal on line 65 which clears SR FF 36 and which also clears all stages of register 22. Thus the CLT is now ready to accept the next data word which will be preceded by a START bit. In the illustrated embodiment shown in FIG. 1 and FIGS. 3 and 7 there are 32 input CLT's giving a total of 64 CLT's arranged electrically in rows and columns. Thus, there are $n^2$ units shown in $n$ rows and $n$ columns each containing $n$ CLT's where $n$, for example, equals 8. See FIG. 1 for example. Since the function of the PPR network 48 in FIG. 4 is to determine which of the eight rows has the highest priority, the output of network 48 is converted into a binary code by the ESI control network 53 and presented to the computer through patchboard 68 as bits $2^3$ through $2^5$ indicating in these three stages, in binary code, the number of the row selected. Similarly, SPR network 50 determines which of the columns (or which CLT in the selected row) receives highest priority and its output is converted into a binary code by ESI Control network 51 and presented to the computer through patchboard 68 as bits $2^0$ through $2^2$ to indicate, in binary code, the number of the column selected. A particular CLT "address" $U_{ij}$ is identified numerically by the number of the row and the number of the column in which it occurs. Thus, a CLT in row 0, column 0 is numbered 00 and is indicated in stages $2^5-2^0$ in binary code as 000000. A CLT in row 1, column 1 is numbered 11 and is indicated in stages $2^5-2^0$ in binary code as 001001. A CLT in row 1, column 6 is numbered 16 and is indicated in stages $2^5-2^0$ in binary code as 001110. A CLT in row 5, column 5 is numbered 55 and is indicated as 101101, etc., through the CLT in row 7 column 7 which is 77. The manner in which the "address" is generated may be shown by relating specific examples to FIG. 4 as follows. Consider a signal from column 3 appearing at the output of SPR network 50. It will be seen that the signal from column 3 is fed to OR gate 100 and OR gate 102. Thus, the output of OR gates 100, 102, and 104 would be binary 110, in that order. That is, OR gate 100 has an output and OR gate 102 has an output. But there is no output from OR gate 104. Thus the decimal numeral three is translated into its binary representation. Consider also a signal representing column 5 appearing at the output of SPR network 50. This signal is sent to OR gate 100 and OR gate 104, thus, giving the binary equivalence of 101. Consider also a signal representing column 7 appearing at the output of SPR network 50. This signal is fed to each of the OR gates 100, 102, and 104, thus giving outputs of 111, which is the binary representation of decimal number 7. It will be seen that PPR network 48 is constructed similarly and operates in a similar manner to the SPR network 50 as has already been described.

The CLT's are placed in a pre-arranged order such that each odd column contains only input CLT's. Thus, columns 1, 3, 5 and 7, each containing 8 CLT's have only input CLT's in those columns. Therefore, since bias $2^0$ through $2^2$ identify the numerical value of a column, then bit $2^0$ may be used to determine whether or not the CLT selected is an input or an output CLT, since that bit position will always contain a "1" if the stored binary number is odd, i.e. 001, 011, 101, and 111 which are the binary equivalents for the decimal numbers 1, 3, 5 and 7. Thus, a "1" in the lowest order or least significant bit position indicates an input CLT, since a one in that position could only indicate a number 1, number 3, number 5 or number 7, all of which are the odd numbered CLT's which, as previously stated, are input CLT's. This signal, then may be used to notify the computer whether an input or an output CLT is desiring service. Thus, as shown in FIG. 4, the output from bit $2^0$ on line 82 is fed to the Input Data Request network 70, the output of which is an IDR signal on line 70*a* to the computer notifying the computer than an input CLT is requesting service. If the CLT requesting service is an output CLT, it will then be located in one of the even columns 0, 2, 4, or 6. As shown in FIG. 4, the signals from each of the even columns are passed from the CLT's via cable 46 as a SR signal. In the C/M 49 at the output of SPR network 50, only the signals from the even columns are fed to OR gate 84 where, if a signal appears on any of the even column outputs, the Output Data Request network 78 transmits an ODR signal to the computer signifying that the CLT requesting service is an output CLT.

Thus, in summary, the IDR signal to the computer is generated within the multiplexer by a Service Request from an input CLT which may be determined by the presence of a "1" on the bit line $2^0$ and the IDR signal informs the computer that an input CLT is requesting service to send data to the computer. The ODR signal to the computer is generated within the multiplexer by a service request from an output CLT which may be determined by the presence of a signal on any of the lines from the even columns and which informs the computer that an output CLT is requesting data to be sent from the computer.

As stated previously, when the computer is operating in the Externally Specified Index mode of operation (ESI), if a peripheral device desires to transmit a data word to the computer, it presents the data word to the computer along with a control signal termed an Input Data Request (IDR). To tell the computer that it should be operating in the ESI mode of operation, either an input or an output CLT will trigger and present an ESI signal to the computer for placing it in the ESI mode of operation. As shown in FIG. 4, either the signal from the $2^0$ bit position on line 82 or the output from OR gate 84 on line 85 will pass through OR gate 72 to trigger ESI signal network 74 which transmits an ESI signal to the computer on line 74*a*.

A summary of the operation of the system when an *input* CLT desires to transmit data to the computer is as follows: When a data word is stored in the CLT word register, the CLT sends a Primary Request (PR) signal to the PPR network in the C/M. The PPR network determines which of the rows of CLT's requesting service (which may be 8 rows) has the highest priority and a Primary Select (PS) signal is returned to the CLT's in that row (which may include 8 CLT's for example). Each CLT in that row requesting service returns a Secondary Request (SR) to the SPR network in the C/M. The SPR network determines which CLT in the selected row has the highest priority and a Secondary Select (SS) signal is returned only to that CLT. Only that CLT may transmit data to the C/M. The PPR and SPR networks in the C/M indicate in the ESI Control network the binary equivalent of the row number and column number in which the requesting CLT is located. This information later enables the computer to keep track of where it received its data and where in its memory section that data is to be stored. The C/M further determines that the selected CLT is an input CLT and then transmits an IDR signal to the computer to tell it that an input CLT desires to send data and the data is present on the data line. The computer then stores the data and returns an IA signal to the CLT which causes it to drop its priority connection with the C/M. Messages continue to be received by the CLT's and the process repeats itself until no further data is available on the input lines.

Consider now the detailed operation of the Primary and Secondary Priority networks 48 and 50 located in C/M 49 and shown in FIG. 5. It will be seen that FIG. 5 discloses an array of CLT's arranged electrically in rows and columns with only three rows and three columns shown for simplicity. It is to be noted that this is not intended to be a limitation but is illustrative only, and that all 64 CLT's shown in FIGS. 1, 3 and 7 would be arranged in a similar manner with 8 rows and 8 columns.

It can be seen from FIG. 5 that the multiplexer control circuitry is composed of three major portions, the first being block 1 showing the CLT's arranged electrically in rows and columns, the second being the Primary Priority Register (PPR) 48 which is found in communications multiplexer (C/M 49) and the third being the Secondary Priority Register (SPR) 50 which is also found in the Communications Multiplexer (C/M) 49 and which may be seen generally in relation to the multiplexer in FIG. 4 as has already been discussed.

Assume that each of the CLT's $U_{ij}$ in block 1 is identical to the CLT shown in FIG. 3, block 2. Further, assume that each CLT has data on its input line 182 which input line is equivalent to input line 8 of the CLT in block 2 of FIG. 3. The internal circuitry of the CLT shown in block 2 of FIG. 3 is shown purely functionally in CLT 00 in block 1 of FIG. 5. It is to be understood that the functional representation in block 1 of FIG. 5 is merely for purposes of illustration and must be considered in actuality to be the same as that shown in block 2 of FIG. 3.

Assume data is on input lead 182 to each of the CLT's in block 1 of FIG. 5. In CLT 00 the input data is applied to gate 184 and also to block 186 which is shown merely to indicate that a PR signal is produced by the receipt of input data. The actual operation has already been explained in conjunction with FIG. 3. The output of circuit 186 is then a Primary Request signal appearing on line 188. As has been explained previously, the Primary Request (PR) signal is actually generated when a complete data word is formed in the registers shown in the CLT in block 2 of FIG. 3. It is assumed therefore, that the Primary Request signal in block 1 of FIG. 5 on line 188 is produced in the same manner. This Primary Request signal plus the Primary Request signal from each of the other CLT's in row 0 are fed to OR gate 98 in Primary Priority Register 48 which contains *n* primary selecting means, $P_1$. Each of the Primary Request signals from CLT's $U_{aj}$ is coupled to a primary selecting means, $P_a$. Thus, the PR signal from the CLT's in row 1 is fed to OR gate 100 and each of the primary request signals from the CLT's in row 2 is fed to OR gate 102. The output of each OR gate 98, 100, and 102 is fed to the respective AND gates 92, 94 and 96 of Primary Priority Register flip-flops 86, 88 and 90. The output of OR gates 98, 100 and 102 is also fed via lines 126, 128 and 130 to the control section of the multiplexer wherein is generated a timing signal (LOAD PRR). The LOAD PRR signal is then returned to the respective PPR flip-flops 86, 88 and 90 on lines 132, 134, and 136 respectively, which are then activated and change states. Assume now that Primary Priority Register flip-flop 86 has changed states. An output signal on lead 121 is fed through inverter 104 to generate a signal which activates the ESI network 74 in FIG. 4. The signal on lead 121 also goes through amplifier 106 and becomes a Primary Select (PS) signal on line 138 and is returned to all CLT's in that row. The output from flip-flop 86 on lead 123 is used to inhibit the outputs of flip-flops 88 and 90. This signal provides an inhibit at AND gate 108 to prevent an ESI signal from being presented by flip-flop 88 and inhibits amplifier 110 to prevent a Primary Select (PS) signal from being sent to the CLT's in row 1. Further, the signal on line 123 passes through OR gate 112 and inverter 114 to provide an inhibit signal on line 127 which inhibits AND gate 116 and amplifier 118 which prevents a Primary Select (PS) signal from appearing as an output of the flip-flop 90 and also prevents any ESI signal from being generated. Thus, it can be seen that although each row of CLT's was requesting service, only row 0, the highest priority row, has a Primary Select (PS) signal returned to the CLT's in that row, since the output of the Primary Priority Register (PPR) 86 produced a signal which inhibited the outputs of the flip-flops of each of the other rows. It can be seen, then, that PPR 86 contains $n$ primary selecting means, $P_i$, shown in FIG. 5 as 98, 100 and 102 plus associated circuitry, with each $P_a$ connected to $U_{aj}$ where $0 \leqslant a \leqslant n$.

As stated previously the PS signal on line 138 is returned to each of the CLT's in the highest priority row, in this case row 0. The signal enters each CLT and at AND 187 will produce a Secondary Request (SR) signal. This secondary request signal is coupled to an SPR which contains $n$ secondary selecting means, $S_j$. Each primary request signal from CLT's $U_{ib}$ is coupled to a secondary selecting means, $S_b$ if the CLT had previously presented a PR signal. Therefore, in the present example, each of the CLT's in row 0 had presented a PR signal and, thus, each would generate a SR signal. These signals are fed to $n$ secondary selecting means, $S_j$, via lines 170, 172 and 174 through OR gates 164, 166 and 168 respectively, to the Secondary Primary Register (SPR) flip-flops 152, 154 and 156, respectively. Here a similar action occurs as was described in relation to the PR. The output of SPR flip-flop 152 is fed via line 153 to lower order SPR F/F's to inhibit such F/F's and prevent them from operating SS signals. Thus, the signal on line 153 inhibits the output from flip-flop 154 and flip-flop 156. Therefore, only flip-flop 152 generates a Secondary Select (SS) signal. This signal is fed to each of the CLT's in column 0. Since the PRR network disabled or inhibited the outputs of the CLT's in any row other than row 0, a SS signal on line 176 is sent to CLT's 10 and 20 will have no effect. However, in the CLT 00, the SS signal on line 176 combined with the PS signal on line 138 opens gate 184, allowing the data on line 182 to pass from the CLT to the communications multiplexer and the computer. Thus, it can be seen that with such a priority system of rows and columns, the highest priority CLT $U_{ij}$, presenting a PR signal to the primary selecting means, $P_i$ in the multiplexer will produce an inhibit signal which will inhibit all CLT's of a lower order and prevent them from presenting PS signals to the CLT's in the lower order rows. Further, since the PS Signal returned to the selected row acts in a similar manner, the highest priority CLT in the selected row will present a SR signal to the secondary selecting means, $S_j$, in the multiplexer which will produce an inhibit signal that inhibits all lower order CLT's and will prevent them from producing SS signals. This, then, is the novel Primary and Secondary Priority network which, when a plurality of CLT's simultaneously request service, will select the CLT of the highest priority and inhibit all lower order CLT's.

From FIG. 5, the impression may be given that when one CLT is communicating with the computer and a higher priority CLT presents a Service Request to the C/M, the C/M will then inhibit the lower order CLT's thus disrupting the CLT that is in the process of communicating with the computer. This condition is called "overloading."

However, when it is realized that the computer is operating fast enough to accept data from the 32 input CLT's and send data to the 32 output CLT's before one data character is formed in the CLT registers, it can then be seen that "overloading" will not occur. Thus, the computer that will process one data character in 40 $\mu$s. while one data bit may be 500 $\mu$s. long (a seven bit data character would then be 3500 $\mu$s. long) will allow the computer time to process from all 64 CLT's before a complete data character is formed in the CLT registers.

In order to allow faster operation of the input and output asynchronous CLT's, Q or buffer registers may be used will accept the data word in parallel from either the computer (when an output CLT is being used) or from the input register of the CLT (when an input CLT is being used). This will allow the computer time to sample all the other CLT's before sending data to or receiving data from an output or input CLT respectively. It is noted that once a character has been transferred from the S-register to the Q register (when an input CLT is used) the CLT can immediately accept another character and staticize it by shifting it bit by bit. In the meantime, the previous character is being held in the Q register awaiting the S signal from the C/M before being transferred to the computer.

In summary, the PPR 48 functions as follows. The CLT's are connected to OR gates 98, 100 and 102 according to priority with OR gate 98 being the highest priority and OR gate 102 the lowest. These OR gates provide an enable signal to set their respective flip-flops 86, 88 or 90. Amplifiers 106, 110 and 118 provide a PS signal to the CLT or CLT's which put up the PR with the same or highest row priority. Inverters 104, 108 and 116 inform ESI control of the hiphest priority row selected. Inverters and amplifiers 108, 110, 112, 114, 116 and 118 provide the inhibits necessary to block all PS signals to lower priority order rows of CLT's and also inhibit signals to ESI control from lower priority CLT's. The highest priority flip-flop 86, 88, or 90 which is set will send a PS signal to that group of CLT's which put up the highest priority request.

Similarly, each CLT that sends a PR signal and receives a PS signal also sends a SR signal to the multiplexer. There the SPR 50 determines priority in the same manner as the PPR 48. The SPR flip-flop in the column having the highest priority and receiving a SR signal inhibits all lower order flip-flops and returns a SS signal to the CLT's in that column. Only the highest priority CLT in that column (having been determined by the PPR) will be responsive to the SS signal and will be connected to the C/M.

Figures 6A, 6B, 6C:
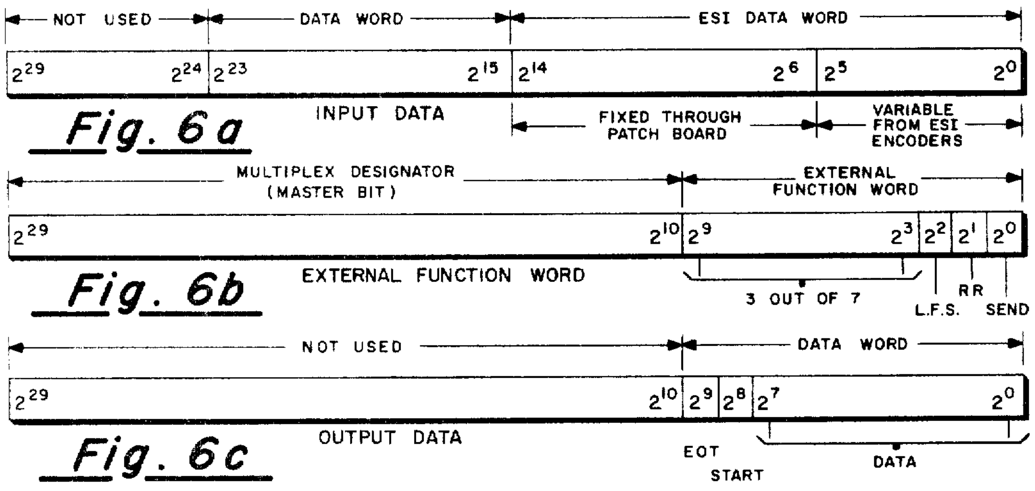

Consider now the computer data lines. As can be seen in FIG. 6, the computer may receive or transmit a 30 bit data word. FIG. 6*a* discloses the arrangement of the bits as related to the computer *input* data lines. As can be seen, bits $2^0$ through $2^{14}$ form the ESI identifier word. Further bits $2^0$–$2^5$, as previously explained, form the binary code which notifies the computer which CLT is requesting service. This portion of the ESI identifier word is variable since its contents will depend upon the CLT requesting service. The other portion of the ESI identifier word, bits $2^6$–$2^{14}$, are fixed and are determined by the manner in which a patchboard is wired. Thus, together bits $2_0$–$2^5$ and $2^6$–$2^{14}$ form the complete ESI identifier word which notifies the computer of the location of the index word which specifies where to store in its memory or where to read from its memory a data word. The data itself is found on bit lines $2^{15}$ through $2^{23}$. Bit positions $2^{24}$ through $2^{29}$ are not used in this configuration.

The computer output data lines are disclosed in FIGS. 6*b* and 6*c*. It will be recalled that the computer first must command a particular CLT to perform a particular function and after the CLT provides the necessary control signals to perform the desired function, the computer must then forward data. Thus, the output data lines of the computer are required to perform two functions, command the CLT's and then forward data to them. When commanding a CLT to perform a desired function, the data lines are composed of two sections the first of which is called the External Function Word (EFW) and which designates the particular function to be performed and the second is termed the multiplexer designator. Bits $2^{10}$ through $2^{29}$ which are termed the multiplexer designator are used only when one output channel of the computer is coupled to a plurality of multiplexers such that the computer must choose the particular multiplexer with which it desires to make contact. Bits $2^0$–$2^9$, as stated previously, form the EFW which gives a command to a particular CLT when accompanied by an External Function (EF) control signal. Thus $2^0$ indicates a SEND signal and informs the output CLT's, both the synchronous and asychronous type, that they are required to send data on the lines to the Data Sets. Bit $2^2$ indicates LOOK FOR SYNCH and is utilized to tell the input synchronous CLT that its data has been received by the computer and that it should therefore terminate sending data to the computer and proceed to look for synch characters on the input lines. The CLT's may be used in automatic answering or automatic dialing systems in which case they will be connected to the phone lines through an interface. Located in the interface is circuitry which is controlled by the computer to disconnect the CLT from the line and this function is performed by the computer transmitting bit $2^1$, REMOTE RELEASE (RR), to the circuitry in the interface. Thus, the REMOTE RELEASE signal, bit $2^1$ is used to terminate a telephone call made when using automatic answering. It is therefore seen that bits $2^0$–$2^3$ denote a particular command to the CLT's.

The remaining bits in the EFW bits $2^3$–$2^9$ are used to determine the particular CLT chosen to receive a command from the computer. If three of these 7 bits are used in a code (3-of-7) to designate the particular CLT, a possible total of 35 combinations is found. Through a patchboard in the CLT's, 32 of these 35 possible combinations are assigned to the individual CLT's and thus the computer, when choosing a particular code of three bits, selects the desired CLT.

The same computer data lines which are used to transmit a command to a particular CLT are also used to transmit the desired data word to the CLT. Thus, after the command has been issued and the CLT selected is ready to receive data, the computer transmits bits $2^0$–$2^9$ to the desired CLT accompanied by an Output Acknowledge (OA) control signal. Bit $2^8$ provides the START bit for the output asychronous CLT. Bit $2^9$ provides the End Of Transmission (EOT) signal to the CLT and bits $2^0$–$2^7$ carry the desired data. Bits $2^{10}$ through $2^{29}$ are not used.

Consider now the output portion of the block diagram of FIG. 2. When the computer desires to transmit data through a particular CLT, it places an EFW (which consists of bit $2^0$, and the 3-out-of-7 code) on data lines 190 and an EF control signal on lines 198. The 3-out-of-7 code in the EFW specifies which CLT is to receive the data. The $2^0$ or SEND bit tells the selected CLT what to do and the EF control signals tells the selected CLT to perform the function commanded. The CLT enters the SEND mode by presenting a PR to the C/M on line 218. As explained previously, if this CLT is in the highest priority row requesting service, it will receive a PS signal on line 222. It will then return a SR to the C/M on line 228. If the CLT is the highest priority in CLT in the row selected, it will now receive a SS signal on line 230. In the C/M, an ODR signal on line 78*a* and the appropriate ESI signal on line 74*a* will be sent to the computer which will then place data on data lines 190 and also transmit an OA signal on line 256. After the CLT has accepted the data word on lines 190, it drops its Service Request to the C/M. The output CLT will then present another Service Request when ready to the C/M and the process repeats itself until the computer terminates the operation by sending an EOT bit $2^9$ on the data lines. This causes the CLT to revert to its idle state.

Consider now the detailed operation of the low speed output asynchronous CLT's. Blocks 258, 260 and 262 in FIG. 7 represent 32 output CLT's with block number 258 showing the circuit details of an asynchronous output CLT.

The computer initiates the sequence of events by transmitting on line 194 the 3-out-of-7 code (which selects the particular CLT desired) and the External Function control signal on line 198. These two signals when present at the input of AND circuit 200 provide an output which is fed to the "set" side of the External Function flip-flop 202. The computer places the SEND command, bit $2^0$, on line 196 which is also fed to the "set" side of External Function flip-flop 202. These two signals when present simultaneously on the set side of the External Function flip-flop cause it to change states and the output of the External Function flip-flop then provides one input to the set side of the Clear-to-Send flip-flop 204. If the external equipment is ready to receive the data from the communication subsystem it sends a CLEAR-TO-SEND (CTS) signal on line 206 which provides the other input to the set side of the Clear-To-Send flip-flop 204. Assuming the output of the External Function flip-flop and the CTS signal being present on the set side of the Clear-to-Send flip-flop, then the Clear-to-Send flip-flop changes state and produces an output on line 220. The signal on line 220 then provides a first input to the set side of the Output Data Request flip-flip 208. The Input Register Clear Decoder 210 detects on lines 254 signals which indicate whether or not the stages in the input register 242 are cleared. If the stages are clear, the output of the Decoder 210 on line 234 is applied as a second input to the set side the Output Data Request flip-flop 208 causing it to change states. The output of the ODR flip-flop is fed via line 214 to the Primary Request amplifier 216 and the Secondary Request AND gate 226. The output of the Primary Request amplifier 216 on line 218 is sent to the multiplexer where, as explained previously, if the CLT is in the selected row, a Primary Select signal is returned to all the CLT's in that row. Assuming that the CLT in block 258 of FIG. 7 is in the selected row, the PS signal is returned to it on line 222 which connects as the other input to Secondary Request AND gate 226. The output of Secondary Request AND gate 226 on line 228 is sent to the multiplexer where, as explained previously, the SPR network determines which of the CLT's in the selected row has the highest priority and returns a SS signal to that CLT. Assuming the CLT in block 258 of FIG. 7 to be the CLT with the highest priority in a selected row, the SS signal is returned via line 230 to the Select and Acknowledge Decoder 224. A second input to Decoder 224 is the PS signal on line 222, which also connects to AND gate 226. When the multiplexer receives a Primary Request signal and a Secondary Request Signal, it will send an Input Data Request or an Output Data Request signal to the computer. Since this is an output CLT, the Communications Multiplexer will send an Output Data Request signal to the computer and the computer will return data on the data lines 190 to the CLT accompanied by an Output Acknowledge signal on line 256. The OA signal on line 256 accompanying the output data on line 190 provides the final enable to the select and Acknowledge Decoder 224. The output of the decoder 224 on line 113 clears the Output Data Request flip-flop causing the request to the Communications Multiplexer to become inactive and also setting a marker bit in stage $2^8$ of the I register 242 of shift register 240. It also provides the enable signal to the AND gates 232 which allow the data on lines 190 to be gated into the I register. Thus the signal on line 223 is a gating signal which automatically sets the $2^8$ stage of the I register and this bit, as stated, is defined as a Marker bit which insures that the correct number of shifts through the register 240 is provided for each data word. The Marker bit, when shifted to the end of the I register, serves as a Stop bit. With the data gated into the stages of I register 242, the Input Register Clear Decoder 210 detects at least the marker bit set in stage $2^8$ of I register 242. The output of decoder 210 on line 234 serves as an input to the Enable Output Clock flip-flop 236 which sets flip-flop 236 and the output of flip-flop 236 provides a gating signal to gate 237 allowing the clock pulses on line 252 from the C/M to be applied to registers 242 and 244 on line 238. The initial data in the stages $2^0$ through $2^8$ and the Start flip-flop of the lower register 242 consists of the START bit. "0," in the Start flip-flop, data in the flip-flops $2^0$ through $2^7$ and a "1" bit in the marker bit position $2^8$. On the first $\phi 1$ of the clock pulses on line 238, the contents of the I register 242 is shifted to the corresponding stages of the S register 244. Thus, the START pulse in the Start flip-flop of the I register is transferred to the start flip-flop of the S-register. This Start pulse appears on the output of the S-register on line 246 which is connected to gate 248. Since the Clear-to-Send flip-flop 204 is set, the inhibit signal on line 220 connected to gate 248 has been removed and the Start pulse passes through gate 248 to line 250. This Start pulse is actually a space on the line and indicates to the equipment on the line that the CLT is starting to send a character. On each $\phi 1$ of the clock pulses on line 238 the contents of the I register is transferred to the S register on each $\phi 2$ the contents of the S register flip-flops is shifted one bit position and transferred to the I register. When the shift register 240 in the CLT has shifted a complete data word character, the register is clear except for the Start stage which remains set from the marker bit which has been shifted completely through the register to the Start flip-flop. The Input Register Clear Decoder 210 detects when stages $2^1$ through $2^8$ are clear and provides an output on line 234 which, when passed through inverter 235, provides one input to the clear side of the Enable Output Clock (EOC) flip-flop 236. When stage $2^0$ of the I register is cleared (by the marker bit being shifted to stage $2^0$ of the S register), it provides an enable to the clear side of the EOC flip-flop 236 which causes flip-flop 236 to change states and stop clock pulses from passing through gate 237. Thus, no further shifting through shift register 240 takes place at this time.

As mentioned previously, the output of the Select and Acknowledge Decoder 224 on line 223 provides a clear signal to the Output Data Request flip-flop 208 which drops the request signals to the multiplexer. Now that the Input Register Clear Decoder 210 detects that all stages in the shift register 240 are clear, it produces an enable pulse on line 234 which resets Output Data Request flip-flop 208 which presents another request signal to the communications multiplexer and the CLT has now requested the next character. Each time it has serialized a character, the CLT requests another character in a manner similar to that explained, until such time as the computer sends an End of Transmission EOT bit ($2^9$) on line 192. Bit $2^9$ is one of the bits on the data lines and is therefore accompanied by the Output Acknowledge signal on line 256. The OA signal causes the Select and Acknowledge Decoder 224 to produce an output on line 223. Bit $2^9$ and the output on line 223 from the Select and Acknowledge Decoder provide the necessary inputs to the clear side of the External Function flip-flop 202 which clears that flip-flop. The output of the External Function flip-flop is then used to clear the Clear-to-Send flip-flop. The output of this last mentioned flip-flop inhibits gate 248 via line 220 and also removes the enable signal from the set side of the Output Data Request flip-flop 208. Thus, the CLT receives data from the computer and serializes it until such time as the computer sends an EOT bit which causes the CLT to drop the request to the multiplexer and to wait for another command from the computer.

In summary, the low speed output asynchronous CLT recognizes a specified External Function Word which requests the CLT to enter the SEND mode. The CLT then generates a Service Request to the communications multiplexer. This request for service consists of a PR and a SR. The communications multiplexer supplies an Output Data Request signal to the computer after which the computer presents the data accompanied by an Output Acknowledge signal to the CLT. On receipt of the Output Acknowledge signal, the CLT stores the data from the computer in its serializer and drops the request for service. The output data, including the Start bit, is received bit-parallel in the serializer, The CLT serializes the bit configuration timed by the clock pulses from the communications multiplexer. The CLT next utilizes the Input Register Clear Decoder to generate the Start pulse and time the Stop pulse for each character. At the beginning of every Stop time (when stages $2^1$–$2^8$ of the input register are clear), the output of the Input Register Clear Decoder generates a Service Request signal to the communications multiplexer. The CLT continues to request characters at the beginning of each Stop time until the EOT character is received. On receipt of the EOT character, the CTS F/F is cleared and its output prevents further bits from being transferred to the line from the serializer. The serializer transfers the EOT character, which character consists of all marks or 1's with no Start bit, through the shift register until stages $2^8$–$2^0$ are clear. At this time the Input Register Clear Decoder stops the clock and the CLT then remains idle until another External Function Word requests it to return to the send mode.

FIG. 8 shows in detail the shift register 240 of FIG. 7. Like numerals indicate like elements in the two figures. Of the 8 stages plus the Start stage shown in FIG. 7, only the Start stage, stage $2^0$ and stages $2^7$ and $2^8$ are shown in FIG. 8 for reasons of drawing simplicity. Assume now that the CLT has recognized a specific External Function Word requesting it to SEND, that it has generated a request for service to the multiplexer, and that on receipt of the Output Acknowledge it has dropped the request for service. Referring now to FIG. 8 it will be seen that the output of the Select and Acknowledge Decoder 224 on line 223 is used to clear the Output Data Request flip-flop, to drop the Service Requests and to set a Marker bit in stage $2^8$. It is also applied to one of the AND gates on the set side of the flip-flops $2^0$ through $2^7$, as for instance AND gates 266 and 276 for stages $2^7$ and $2^0$ respectively in FIG. 8. The data pulses on lines 190 are then combined with the signal on line 223 in stages $2^0$ through $2^7$ to enter the data into these stages. The signal on line 223 is also applied to AND gate 280 on the clear side of the START flip-flop. Also bit $2^8$ appearing on data lines 190 is applied to this AND gate, and together, these signals clear the START flip-flop or set it initially to the "0" state. Input Register Clear Decoder 210 now detects at least the marker bit in stage $2^8$ and provides an output signal on line 234 which starts the clock running through the Enable Output Clock flip-flop 236. It will be seen that on the first $\phi 1$ clock signal, the AND gates in the upper register stages will transfer the contents of the lower register flip-flops to the corresponding upper register flip-flops. On the $\phi 2$ clock signal, the contents of the upper register stages are transferred to the lower register stages but shifted one bit position. This sequence continues until the Marker bit which was set initially in stage $2^8$ is transferred to the $2^0$ flip-flop in the lower register. At this point the Input Register Clear Decoder 210 detects that all stages $2^1$–$2^8$ are clear and thus stops the clock and provides another Service Request. It can be seen that the novel shift register employed in the system requires no external counter to control or keep track of the shifting of the proper number of bits through the stages.

FIG. 9 shows the novel shift register used in the low speed input asynchronous Communication Line Terminal which is shown in block diagram form in FIG. 3. The figure shown contains only 4 stages but is not intended to be a limitation and may be extended to any number of stages desired. The figure shown is for illustrative purposes only.

The shift register functions generally as follows. The lower rank register consists of flip-flops $2^0$ through $2^4$ and the upper rank consists of flip-flops $2^1$ through $2^4$. On each $\phi 1$ signal from the clock, the contents of the lower rank flip-flops are gated to the upper rank with a self-clearing feature, more specifically when the lower rank is in a cleared condition, i.e., if the lower rank contains logical "0" signals in all stages, the next $\phi 1$ transfers the contents to the upper rank which will then be in a cleared condition. On each $\phi 2$ of the clock, the lower rank shifts the contents of the upper rank 1 bit position and stores the shifted bits.

Consider now the detailed operation of the novel shift register. Assume that all the flip-flops are in the clear state initially. The start pulse of the serial input data appearing on line 284 is used to initiate the clock and on $\phi 2$ output from the clock, the START pulse is shifted in to flip-flop $2^4$ of the lower register. On $\phi 1$ of the clock, the START pulse stored in the lower register flip-flop $2^4$ is transferred into flip-flop $2^4$ in the lower register, the START pulse being transferred from stage $2^4$ in the upper register to stage $2^3$ in the lower register. The serial pulses on the input line are shifted similarly through the shift register until the START pulse reaches flip-flop $2^0$ in the lower register. At that time it sets the $2^0$ flip-flop. The output therefrom stops the clock and opens the gates 286, allowing the data stored in flip-flops $2^1$ through $2^4$ in the lower register to be gated out in parallel fashion to the C/M. Thus, it may be seen that it is not necessary to have a separate unit to count the number of pulses to be stored before preventing further pulses from entering the shift register. In the shift register of this invention, each data character is preceded by a START pulse. The START pulse is shifted through each stage to the final stage. The final stage utilizes the START pulse as a STOP pulse which stops the clock preventing further data from being transferred into the shift register. It also opens gates 286 to allow data stored in flip-flops $2^1$ through $2^4$ and the lower register to be transferred in parallel to the output lines. Thus, it is seen that the shift register is completely automatic, requiring no separate circuit to count the input data pulses before providing the necessary control signals to accept further input data. The register must be cleared to an all zero state before starting the shift in of the next character so that left over data bits shifting into $2^0$ do not cause erroneous stops. This is accomplished by the IA signal from the computer combined in gate 64 with the output of gate 56 as shown in FIG. 3.

It has been stated previously that the CLT's may be of the synchronous or asynchronous type. The CLT's described previously have been the asynchronous type, i.e. START and STOP bits are required for their operation. Consider now the operation of a synchronous Input CLT. The Input Synchronous CLT takes in data characters bit-serially from data sets on the line and emits each data character in bit-parallel fashion to the computer's input channel via the C/M. The Input Synchronous CLT starts with the receipt of two identical Synch charactcers sent on the data lines from the Data Set back-to-back. This feature prevents a false start due to noise. Prior to this time, the CLT was placed in an idle state by an activated "Look For Synch" line. This process of de-activating the Input CLT is initiated by the computer sending an External Function signal, which when combined with the "LOOK FOR SYNCH" signal, places the Input Synchronous CLT in the idle condition.

In general, the control section of the Synchronous Input CLT detects two identical synchronizing characters back-to-back in the staticizer, generates Primary and Secondary Requests, detects Primary and Secondary Select signals, recognizes the completion of shifting of a character and provides the internal timing. The control section, as stated previously, will be cleared upon receipt of the "LOOK FOR SYNCH" character from the computer and the CLT will be placed in the idle condition.

The staticizer is a shift register divided into two parts termed the I register and the S register. Data is received by the staticizer bit-serially from the Data Sets and transferred in bit-parallel form to a Q register from which it is transferred in parallel to the computer via the multiplexer.

The Q register is a one word buffer register between the staticizer and the multiplexer which permits the staticizer to continue to function without waiting for the computer to accept data. Data, as stated previously, is transferred to and from the Q-register in bit-parallel format.

Consider now the operation of the novel Synchronous Input CLT shown in FIG. 10. When a data set recognizes the presence of a signal on the telephone lines, it sends a Serial Clock Receive (SCR) signal to the CLT to which it is connected. The CLT clock then alternately produces signals. As stated previously, in order to prevent random noise from starting the Input CLT the control circuitry is designed to begin the receive mode only after receiving two identical synchronizing characters in adjacent time slots. Thus, when a Synch character appears in the I-register 296, it is detected by AND gate 298 which sends a signal via line 299 to AND gate 300. If Receive flip-flop 302 and Synchronous flip-flop 304 are in the cleared condition, they provide output signals on lines 303 and 308, which together with the Synch character detection signal on line 299, produce an output from AND gate 300, thereby setting flip-flop S08. The output of flip-flop S08 sets the Synch flip-flop 304 and also provides a signal on line 310 which is connected to AND gate 312. When combined with the $\phi 2$ signal of the clock, gate 312 produces a Clear Input Register signal on line 314 which clears all stages of the I register except stages $2^6$ which contains a "1" or Marker bit. The setting of Synch flip-flop 304 provides an inhibit signal on line 308 to AND gate 300 and further provides an enable signal through OR gate 316 to line 318 and the set side of flip-flop I08.

As data on the input line continues to be shifted into the I register, the Marker bit, which was established in stage $2^6$ by the Clear Input Register signal, advances through each stage of the I and S registers until it is shifted out of stage $2^0$ in the S register and appears at the set side of flip-flop I08. This signal, in conjunction with the enable signal from Synch flip-flop 304, causes flip-flop I08 to set. Flip-flop S08 had been previously cleared when the Synch flip-flop 304 set and removed the enable from AND gate 300 which then provided a signal to the clear side of S08 clearing it. Now that the second Synch character has been received and I08 has been set, one output of I08 re-sets flip-flop S08. The other output of flip-flop I08 is fed to the AND gate on the set side of the Receive flip-flop 302. Further if the Synch character is a valid one and has been detected by AND gate 298, a signal on 299 is also fed to the AND gate on the set side of Receive flip-flop 302 and these two signals in conjunction with $\phi 1$ of the clock causes the Receive flip-flop to set. At this point the Receive and Synch flip-flops are set as well as flip-flops I08 and S08. The output of the S08 flip-flop, as well as setting Synch flip-flop 304, provides an output on line 310 which again, through gate 312, generates a Clear-Input Register signal on line 314 for clearing every stage of the I register except stage $2^6$ in which a "1," or a Marker bit, is placed. Further, the output of S08 is fed to the clear side of the I08 where it clears that flip-flop. When I08 is cleared, its output clears S08. At this point, the Receive flip-flop 302 and the Synch flip-flop 304 are set but flip-flops I08 and S08 are in the clear state. The next character may be either a synch or a data character. The Marker bit in stage $2^6$ will shift through the I register ahead of the incoming data and will set flip-flop I08. The output of I08, in turn, generates the command Transfer S-to-Q by setting S08. Thus, all data in the shift register will be transferred to the Q register. Simultaneously the Clear Input Register signal appearing on line 310 via gate 312 generates a CLEAR I signal. This signal clears all stages of the I register except stages $2^6$ and $2^7$. The Clear Input Register signal on line 310 from flip-flop S08 is also conveyed to the AND gate associated with the set side of the Input Service Request (ISR) flip-flop 320. A second Input to this last mentioned AND gate is the output from the set side of the Receive flip-flop 302. The third input to the ISR flip-flop necessary to cause it to set is the output from the clear side of the Synch flip-flop 304. It will be remembered that at this time the Synch flip-flop 304 is set and thus the signal on line 308 from the Synch flip-flop will be an inhibiting signal to the AND gate of ISR flip-flop 320. To enable a Primary Request to be generated from the ISR flip-flop 320, the Synch flip-flop 304 must be in the clear state. This is accomplished by the combination of the signal on line 301 from flip-flop I08 and the signal on line 209 from AND gate 298 which has detected no synch character through Inverter 210. These two signals cause the Synch flip-flop to be cleared, which then provides an enable signal on line 308 to the ISR flip-flop causing it to be set. If the character received was a synch character the ISR flip-flop will not set due to the disable from the synch flip-flop. Therefore, no character will be transferred to the computer and the input CLT will examine the next character received in a like manner. When the ISR flip-flop 320 is set, it provides a signal on line 322 to amplifier 324 and AND gate 326. The output of amplifier 324 is a Primary Request signal which is sent to the priority register in the C/M. Assuming that the CLT in FIG. 10 is the highest priority CLT requesting service, a Primary Select signal is returned from the C/M via line 328 and is sent to AND gates 330 and 326. The output of AND gate 326 is the Secondary Request signal which is sent to the SPR in the C/M. Assuming the CLT in FIG. 10 to be the highest priority CLT requesting service, a SS signal is sent to AND gate 330 via line 332. AND gate 330 now has an output which is fed via line 334 to the clear side of ISR flip-flop 320. It is also sent to the gates 309 on the output of the Q-register 307 and these gates are enabled allowing the output of the Q-register to be placed on the lines to the C/M. When the computer has sampled the data on the C/M lines, it returns an Input Acknowledge signal on line 336 which also is connected to the clear side of the Input Service Request (ISR) flip-flop 320. A combination of the Input Acknowledge signal and the output of AND gate 330 is sufficient to clear the Input Service Request flip-flop and thus drop the Primary Request signal to the C/M. When the next data character is shifted in from input line 297, the Marker bit in stage $2^6$ of the I register will be shifted through the shift register and will set flip-flop I08 which, in turn, will set flip-flop S08. The output of flip-flop S08 cannot set the Synch flip-flop since the Receive flip-flop 302 is set and, hence, provides an inhibit signal to the set side of the Synch flip-flop on line 303. However, the output of flip-flop S08 on line 310 provides a transfer S-to-Q command signal through AND gate 311, enables the Input Service Request flip-flop 320 to be set and provides a Clear Input Register signal through gate 312. Thus, the sequence continues to repeat itself for each data character coming in on the lines. That is, each data signal coming in serially from an input device is shifted through the S register until all stages are loaded at which time the staticized data character is transferred in parallel fashion to the Q-register. The PS and SS signals from the C/M open the gates 309 allowing the data in the Q-register to be transferred to the computer. Additionally, the PS and SS signals, in combination with the IA signal from the computer, clears the Input Service Request flip-flop 320, thereby dropping the Service Request to the C/M.

After the last data character has been sent to the Input CLT, the computer recognizes that a complete message has been received. The manner in which it makes this recognition forms no part of the present invention and will not be described in detail. After the computer recognizes that a complete mesasge has been received, it initiates an External Function control signal which is applied to the CLT on line 338. A 3-out-of-7 code is also developed on line 340 which identifies that particular CLT. Further it will send a LOOK FOR SYNCH pulse, bit $2^2$, to the CLT on line 346. The output of AND gate 342 on line 344 and the LOOK FOR SYNCH pulse on line 346 are combined to clear the Receive flip-flop 302. When Receive flip-flop 302 has been cleared the Input Service Request flip-flop 320 is immediately disabled from being set, thus preventing any more Service Requests from being sent to the C/M. Flip-flop I08 is also prevented from being set. The entire control section (Input Service Request flip-flop 320, Receive flip-flop 302, and the Synch flip-flop 304 plus flip-flops S08 and I08) is now in the cleared state and awaits two new Synch characters back-to-back before beginning another cycle.

The preceding example describing the operation of the Synchronous CLT presumed that two valid characters were received back-to-back. Assume now that a noise impulse simulates a single valid Synch character. Initially, it will be remembered that all flip-flops, i.e., the Input Service Request flip-flop 320, Receive flip-flop 302, Synch flip-flop 304 and flip-flops S08 and I08 are cleared. The Synch character generated by noise is detected as a valid Synch character by AND gate 298 which, through AND gate 300, sets flip-flop S08. The output of flip-flop S08 sets the Synch flip-flop S04 and the output of Synch flip-flop 304 on line 308 removes one enable signal to AND gate 300 the output of which is used to clear flip-flop S08. This condition, then, is the same condition that exists when a valid Synch character appears. However, assume that the second character is not a Synch character but a random noise character. The Marker bit which was generated by the Clear Input Register signal on line 310, which is the output of the S08 flip-flop, is now shifted through the S register and sets I08. However, the output of flip-flop I08 cannot set Receive flip-flop 302 because no Synch character is detected on line 299. However, the output of the I08 flip-flop is also fed to the clear side of the Synch flip-flop 304 along with the signal on line 299 which indicates no Synch character has been detected. These two signals clear Synch flip-flop 304 and the control section is returned to its cleared state awaiting two valid Synch characters back-to-back. Thus, it can be seen that a single Synch character generated by noise pulses is not sufficient to cause the CLT to begin operation and thus process invalid data signals.

To summarize the operation of the synchronous input CLT, all flip-flops are initially in a cleared state. This includes the ISR flip-flop 320, the Receive flip-flop 302, the Synch flip-flop 304 and flip-flops I08 and S08. When the first valid synch character is detected by AND gate 298, it sets flip-flop S08 through AND gate 300. The output of flip-flop S08 sets Synch flip-flop 304 and the resulting output of Synch flip-flop 304 on line 308 clears flip-flop S08 via gate 300 leaving Synch flip-flop 304 in the set state. Prior to the clearing of the S08 flip-flop, it has generated a CLEAR I signal which clears all stages of the I-register except stage $2^6$ (which is set with a Marker bit) and stage $2^7$. This Marker bit precedes the next valid Synch pulse through the S-register and it sets flip-flop I08 which has been enabled by the setting of Synch flip-flop 304. (The setting of Synch flip-flop 304 had removed the inhibit signal from line 308 to the clear side of I08.) When flip-flop I08 is set by the Marker bit, its output sets Receive flip-flop 302 (via line 301) and flip-flop S08. The output of S08 again generates a Clear Input Register signal through gate 312. It also clears I08 which, in turn, clears S08. Thus, the Receive flip-flop 302 and the Synch flip-flop 304 are left in the set state. The next data bit is again preceded by a Marker bit. The Marker bit sets flip-flop I08 which, in turn, sets flip-flop S08. The output of S08 generates a Clear Input Register signal which completely clears all stages of the I-register except stages $2^6$ and $2^7$. It also generates a TRANSFER S-to-Q signal which gates the data in the S-register to the Q-register. It also provides the final enable signal to the Input Service Request flip-flop which generates a Primary Request signal. On the return from the C/M of both a Primary Select and a Secondary Select signal AND gate 330 generates a signal which opens the Q-to-C/M gates allowing the bits stored in the Q-register to be transferred on the lines to the C/M. The output of gate 330 also resets the Input Service Request flip-flop thus dropping the Service Requests. The next data word is again preceded by the Marker bit and the sequence is repeated. When the computer has recognized a complete message, it clears the Receive flip-flop with an External Function signal, a 3-out-of-7 code and a LOOK FOR SYNCH bit $2^2$. The output of the Receive flip-flop 302 disables the Input Service Request flip-flop which prevents further Service Requests and also disables flip-flop 108 and prevents it from setting. Thus the control section is again clear and now awaits two new Synch characters.

The complete shift register 315 in FIG. 10 is shown in detail in FIG. 11. Like numerals in FIGS. 10 and 11 indicate like components. As may be seen from FIG. 11, the complete shift register 315 consists of I-register 296, S-register 305 and Q-register 307. It will be seen that each of these registers consists of stages $2^0$ through $2^7$.

Assume that the Data Set on the input line has started the clock in the CLT and the clock is producing both $\phi 1$ and $\phi 2$ pulses. Assume further that each stage of the Q, S and I registers is in the cleared state. It will then be seen that a data bit on data line 297, after having passed through inverter 350, will set stage $2^7$ in I-register 296 when a $\phi 2$ pulse from the clock is applied concurrently to the AND gate on the set side of stage $2^7$. Thus, this data bit will be stored in stage $2^7$. On $\phi 1$ of the clock, the output from stage $2^7$ in the I-register will be entered into stage $2^7$ of the S-register since both a $\phi 1$ clock pulse and the output of stage $2^7$ in the I-register are present at the AND gate on the set side of stage $2^7$ in the S-register. On the next $\phi 2$ of the clock, the second data pulse on line 297 will be transferred into stage $2^7$ of the I-register, and the output of stage $2^7$ of the S-register will be transferred to stage $2^6$ of the I-register via lines 301. On the next $\phi 1$ of the clock the information stored in both stages $2^6$ and $2^7$ in the I-register will be transferred to the corresponding stages in the S-register. Thus, it will be seen that the data which is appearing serially on line 297 is shifted to the S-register from the I-register and, from the S-register, shifted one bit position and transferred back to the I-register. This process continues until the serial data bits have been stored in registers $2^0$ through $2^7$ of the S-register.

Assume now that a valid Synch character has been stored in stages $2^0$ through $2^7$ of the I-register, and that this Synch character has been detected by AND gate 298 which has now has an output on line 299. It should be noted at this time that while the inputs to AND gate 298 are connected to the right side of each of the stages $2^0$–$2^7$ of the I-register, it is clear that these connections could just as easily have been made to the left side of stages $2^0$–$2^7$. Thus, any combination of bits may be chosen to be a Synch character and proper connections can be made to the I-register to detect it. The connections shown, therefore, are for illustrative purposes only and are not intended to be limiting. Assuming also that the Receive flip-flop and the Synch flip-flop are clear, AND gate 300 will now have an output which will set flip-flop S08. On $\phi 1$ of the clock, the data stored in I-register flip-flops will be transferred to the corresponding flip-flops in the S-register. On $\phi 2$ of the clock, the output of the S08 flip-flop on line 310 will pass through gate 312 and clear stages $2^0$–$2^5$ and set stage $2^6$, thus readying the I-register for the receipt of the next Synch character. The second Synch character and the first data character will be processed in a similar manner by shift register 315. It will be recalled that the Marker bit, which precedes each data character, sets flip-flop 108, which, in turn, sets S08 to generate an S-to-Q-transfer signal on line 317. It will be recalled that the output of S08 also sets the Input Service Request F/F, the output of which will generate a Primary Request signal. When both Primary Select and Secondary Select signals have returned from the C/M, AND gate 330 will generate a transfer-Q-to-C/M-signal on line 334, allowing the data character which has been stored in the Q-register to be transferred in parallel on the lines to the C/M and the computer. Thus, it can be seen that the novel shift register requires no external counter to determine when the proper number of data bits have been shifted into the register or to provide the necessary control signals for shifting the stored pulses out and entering new serial data into the shift register.

Consider now the operation of the Synchronous Output CLT as shown in FIG. 12. The computer initiates the sequence of events by transmitting bit $2^0$ (SEND bit) on line 358 to the CLT, while simultaneously sending the three-out-of-seven code on line 352 and the External Function control signal on line 354. AND gate 356 then sends a signal to the set side of the External Function flip-flop, which, when combined with the SEND bit on line 358 causes the External Function flip-flop to be set. The output of either the External Function flip-flop on line 362 or the Send F/F 365 on line 364 will produce a Request-To-Send (RTS) signal on line 368 through OR gate 366. The RTS signal is sent to the Data Set on the line. The Data Set, if it is available to receive data, will send a Clear-To-Send (CTS) signal on line 370 to the CLT. The clock 359 in the CLT continually produces $\phi 1$ and $\phi 2$ pulses from a square wave pulse train from the Data Set on line 357. The Clear-To-Send signal on line 370 is ANDed with the output of the External Function flip-flop 360 on line 372 to set the Clear-To-Send flip-flop. The output from the Clear-To-Send flip-flop 374 on line 376 provides one enable signal to AND gate 378. Assuming Acknowledge Resynch (ARS) flip-flop 380 and Acknowledge (ACK) flip-flop 382 to be in the clear state, their respective output lines 384 and 386 will provide enabling signals to AND gate 378. This causes AND gate 378 to produce a pulse on its output line 388. This pulse passes through inverter 390 to produce a Primary Request signal on line 392. Further, on line 389 it also provides a clear Q-register signal which clears all stages of the Q-register. Assuming this CLT to be in the highest priority row of CLT's requesting service, a Primary Select signal will be returned to this CLT on line 394 which will provide one enable to AND gate 396 and also provide an enable to AND gate 398. Since the output of AND gate 378 on line 388 is also present at AND gate 398, it provides an output on line 400 which is a Secondary Request sent to the C/M. Assuming this CLT to have the highest priority of all CLT's in the selected row, a Secondary Select signal will be returned on line 402 which provides a second enable to AND gate 396. It will be recalled that if the CLT with the highest priority is an output CLT, the C/M will send an Output Data Request (ODR) signal to the computer. Upon receipt of the ODR signal, the computer will place data on the lines and also transmit an OA signal to the selected CLT, indicating that data is on the lines. This OA signal will appear on line 404, which provides the third and final enable to AND gate 396. Further, the data is present on lines 406 at gates 410 ready to enter the Q-register. With all three enabling signals present to the input of AND gate 396, its output on line 408 will set Acknowledge (ACK) flip-flop 382 and will also provide an Enter Q signal to gates 410 of the Q-register which will enable the data on line $2^0$–$2^7$ to enter the respective stages of the Q-register 412. The ACK flip-flop 382, since it has been set, will remove its enable signal on line 386 to AND gate 378, thus removing the Service Request to the C/M. Further, the output of ACK flip-flop 382 will also set ARS flip-flop 380. The output of the ARS flip-flop 380 on line 381 will provide one enable signal to AND gate 428. If stages $2^2$–$2^8$ of the S-register 416 are clear, this will be detected by AND gate 420 which will produce a signal on line 422 to thereby provide a second enable to AND gate 428 and an inhibit signal to gate 430 through inverter 429. If any of the stages $2^2$–$2^8$ of the S-register 416 are not clear, the output of AND gate 420 on line 422 will be an inhibit signal to AND gate 428 and an enable signal to AND gate 430. Assuming, however, that stages $2^2$–$2^8$ of the S-register 416 are clear, AND gate 428 will produce an output on line 424 which will establish a Marker bit in stage $2^8$ of O-register 414. It will also enable gate 426, which gates the data in the Q-register to the respective stages of the O-register.

At this time, the second Service Request is presented to the C/M. The signal on line 424, which caused the Q to O transfer, will also clear ACK flip-flop 382, the output of which will clear ARS flip-flop 380. The output of ARS flip-flop 380 on line 384 and the output of the ACK flip-flop 382 on lines 386 will provide the necessary enables to AND gate 378 to cause an output on line 388 which will pass through inverter 390 and present another Primary Request signal to the C/M on line 392.

The data bit in position $2^0$ is available at this time on line 438 and will be transmitted to the Data Set on the line through gate 436 which is opened as follows: The output from AND gate 428 on line 424 is sent to Send flip-flop 365 where it is ANDed with the output of the CTS flip-flop 374 causing the Send flip-flop 365 to change states and produce an enable signal on line 391. This enable signal opens gate 436 allowing the data in bit position $2^0$ to be sent to the Data Set on the output line. The first $\phi 2$ of the clock will then cause the data in bit positions $2^1$–$2^8$ of the O-register to be transferred to the corresponding stages of the S-register.

Since the stages of the S-register 416 are loaded at this time, AND gate 420 is producing an enable signal on line 422 which allows a $\phi 1$ clock pulse on line 432 to pass through AND gate 430. This $\phi 1$ pulse on line 434 presents a shift pulse to the stages of the O-register 414, causing the data in stages $2^1$–$2^8$ of the S-register to be transferred to stages $2^2$–$2^7$ of the O-register. A detailed operation of shift register 417 will be explained in conjunction with FIG. 13. Suffice it to say for the present that on each $\phi 2$ of the clock, the contents of the O-register will be transferred to the S-register. Because AND gate 420 senses that the S-register is loaded, it provides an enable signal to gate 430. The output of gate 430 produces a shift pulse on the first $\phi 1$ of the clock. This shift pulse causes the contents of the S-register to be transferred to the O-register shifted by one bit position. The next $\phi 2$ clock pulse transfers this data to the corresponding stages of the S-register. This process will continue until the Marker bit in stage $2^8$ of the O-register has been transferred through stage $2^2$ of the S-register and into stage $2^1$ of the O-register. When the Marker bit is shifted out of stage $2^2$ of the S-register, AND gate 420 senses that stages $2^2$–$2^8$ of the S-register are cleared and provides an inhibit signal on line 422 which inhibits gate 430 preventing further shift pulses from being applied to the O-register. This leaves the last data bit on stage $2^0$ and the Marker bit in stage $2^1$ of the O-register. In the meantime, the C/M has returned a Primary Select and a Secondary Select signal on lines 394 and 402 respectively while the computer has presented the next data character on lines 406 accompanied by an OA signal on line 404, thus causing an output at AND gate 396. The signal on line 408 opens gates 410, allowing the data on lines 406 to be transferred into the Q-register and the cycle repeats itself. Thus, it can be seen that each time the output of AND gate 428 on line 424 causes a Q to O transfer, the CLT will request another data character from the computer since ACK flip-flop 382 and the ARS flip-flop 380 are both cleared by the same signal which causes the Q to O transfer.

When the computer has finished transmitting a message to the CLT, it transmits an End-of-Transmission (EOT) character, which is a special character consisting of all 1-bits in computer data bit positions $2^0$–$2^7$ and $2^9$ ($2^8$ is not used). The CLT control section utilizes bit $2^9$ on line 440 to clear the EF flip-flop 360. This, in turn, clears the CTS F/F 374. The remaining bits, $2^0$–$2^7$ are loaded into the Q-register. When the last data character has been shifted out, another Q to O transmission occurs because of the signal from AND gate 428 on line 424 and the EOT character is transferred to the O-register. The output of AND gate 428 on line 424 is also sent to the Send flip-flop 365 and causes that flip-flop to be cleared, de-activating the RTS signal to the Data Sets on the line. It also disables gate 436 via line 391 so that its output is in a continual "marking" condition which appears as a "1" on the line. Neither the Clear Q signal on line 389 nor the Primary Request signal on line 382 could be generated at this time since AND gate 378 is disabled or inhibited by the clearing of the CTS flip-flop 374. The dropping of the RTS signal to the Data-Set on the line results in the dropping of the CTS signal from the Data Set on line 370. The next $\phi 2$ clock pulse transfers the data character from the O-register to the S-register. The next $\phi 1$ clock pulse shifts the bits one stage in transferring them to the O-register. Thus, the "1" bits in the EOT character are shifted through the serializer until the Marker bit rests in stage $2^1$ of the O-register. At this time AND gate 420 detects that stages $2^2$–$2^8$ of the S-register are cleared and provides an inhibit signal to gate 430 any $\phi 1$ shift pulse from being applied to the stages of the O-register. Thus, the shifting stops and the Marker bit stays in stage $2^1$ of the O-register. The bits of the EOT character that have been shifted through the serializer do not go out on the line since gate 436 has been closed as previously explained. The Marker bit remaining in stage $2^1$ of the O-register will not go out on the line when the CLT re-activates because the Send flip-flop 365 (which opens gate 436) cannot be set until gate 428 supplies a Q to O signal for the first character so as to allow the new data bits to be shifted into the stages of the O-register and a new cycle begins.

The operation of the synchronous output CLT may be summarized as follows. The sequence of events is initiated by the computer which sends an External Function Word which comprises an External Function control signal, a 3-out-of-7 code, and a $2^0$ SEND bit which sets the EF flip-flop of the Output Synchronous CLT and causes a RTS signal to be sent to the Data Sets on the line. If the Data Sets on the line are in condition to accept data, they send a CTS signal which sets the CTS flip-flop in the CLT. This flip-flop causes a PR signal to be sent to the C./M. Assuming this CLT to have the highest priority of all CLT's requesting service, the C/M will return both a PS and SS signal which, when accompained by the OA signal from the computer, will gate the data from the computer into the Q-register. This same signal causes the Service Request signals to the C/M. to be dropped. It will also cause both the ACK and the ARS flip-flops to be set and the output of the ARS flip-flop will cause a Q to O signal to be sent to the gates of the O-register. This Q to O signal will also set a Marker bit in stage $2^8$ of the O register.

On each $\phi 2$ of the clock, the data is transferred from the O-register to the corresponding stages of the S-register. On each $\phi 1$ of the clock being supplied through AND gate 430, the data in the stages of the S-register is shifted one bit position and stored in the stages of the O-register. This shifting cycle continues until the Marker bit which was stored in stage $2^8$ of the O-register by the Q to O transfer signal is stored in position $2^1$ of the O-register. At this time AND gate 420 detects that the stages of the S-register are clear and provides an inhibit signal stopping $\phi 1$ clock pulses to the O-register. In the meantime, the clearing of the ACK and the ARS flip-flops by the Q to O transfer signal has enabled AND gate 378 which causes the CLT to request another data character from the computer and at the same time, clears the Q-register so that it can receive the new data character. As explained before, the C/M selects the CLT requesting service with the highest priority and the new output data character is gated into the Q-register of the CLT upon receipt of the PS, SS, and OA signals. The combination of these three signals causes the ACK flip-flop and the ARS flip-flop to be set, thereby disabling any new requests. When the serializer has shifted out the previous character, another Q to O transfer is generated and the cycle is repeated. The computer ends the cycle by transmitting the EOT character which includes a "1" in bit position $2^9$ which clears the EF flip-flop. The output of the EF flip-flop will also clear the CTS flip-flop. When the CTS flip-flop output is combined with the last Q to O transfer signal, the Send flip-flop is cleared. When the send flip-flop is cleared it will remove the RTS signal to the Data Set. The Data Set on the line then drops the CTS signal to the CTS flip-flop. A new cycle cannot begin until this signal is present. Gate 436 is also disabled, which will prevent data from being shifted out on the lines and will cause a continual marking condition to be placed on the line. The CLT now remains idle until another External Function Word is detected.

The shift register 417 disclosed in FIG. 12 will now be discussed in detail in conjunction with FIG. 13. Assume that stages $2^1$ through $2^8$ of the S-register are clear. Assume also that a Clear Q-register signal was present on line 389. This signal is fed to the clear side of each stage of the Q-register, thus clearing the Q-register entirely. Assume also that the PS signal and the SS signal have been returned from the C/M on lines 394 and 402 respectively. Further, assume that an OA signal on line 404 is accompanied by data from the computer on lines 406. The output of AND gate 396 will then be an ENTER-Q signal on line 408 which will gate the data on lines 406 into stages $2^0$ through $2^7$ of the Q-register. Further, the ENTER-Q signal on line 408 will also activate circuitry to drop the Service Request and will set the ARS flip-flop which will produce an output on line 381 to AND gate 428. Since all stages of the S-register are cleared, AND gate 420 will produce an output on line 422 which is connected to AND gate 428 and AND gate 430. This signal on line 422 provides an enable to AND gate 428 and an inhibit signal to AND gate 430. Thus, AND gate 428 will have an output on line 424 which is a TRANSFER Q-to-O signal, and will set a Marker bit in flip-flop $2^8$ in the O-register. It will also cause the data which is stored in the stages of the Q-register to be transferred to the corresponding stages of the O-register. On the next $\phi 2$ of the clock, the data is stages $2^1$ through $2^8$ of the O-register is transferred to the S-register. As soor as this occurs, AND gate 420 detects that the stages of the S-register are no longer clear, and provides a signal on line 422 which is an inhibit signal to AND gate 428, thus stopping the Q-to-O transfer signal but providing an enable signal to AND gate 430, thus causing a $\phi 1$ shift pulse to be applied to stages $2^0$ through $2^8$ of the O-register. At this time the data that is stored in he stages of the S-register will be shifted one stage and stored in the stages of the O-register. On the next $\phi 2$ of the clock, the data in the O-register stages $2^1$–$2^8$ will again be transferred to corresponding stages in the S-register, while on the next $\phi 1$ of the clock, gate 430 will produce another shift pulse and the data in the S-register stages will again be shifted one stage and transferred to the stages of the O-register. Thus the bits which are transferred in parallel from the Q-register to the O-register are transferred out of stage $2^0$ of the O-register in serial form on line 438 through gate 436 to the Data Sets on the output lines. When the last data bit is transferred from stage $2^1$ of the S-register to $2^0$ of the O-register, the Marker bit which was initiated in stage $2^8$ of the O-register is now located in $2^1$ of the O-register. At the next $\phi 2$ pulse, all states $2^2$–$2^8$ of the S-register are clear and AND gate 420, detecting that these stages are clear, provides an inhibit signal to AND gate 430 which prevents further shifting of the data and provides an enable signal to gate 428 which now provides another command TRANSFER Q-to-O on line 24, thus transferring any new data from the computer which has been stored in the Q-register to the O-register. It will therefore be seen that the novel shift register is entirely automatic and does not require the use of an external counter to determine when necessary control signals must be applied to start and stop the shift register at the appropriate time.

It will be noted that the output of stage $2^7$ of the Q-register is applied via line 442 to the set side of stage $2^7$ of the O-register. The output of stage $2^1$ of the Q-register, however, is applied on line 444 to the clear side of stage $2^1$ of the O-register. Stage $2^0$ of the Q-register has its output on line 446 applied to the set side of stage $2^0$ of the O-register and its output on line 448 applied to the clear side of stage $2^0$ of the O-register. The reason for this is that when the last data bit is in stage $2^0$ of the O-register, the Marker bit is in stage $2^1$ of the O-register, and stages $2^2$ through $2^8$ are all clear. It will be at this point that the data from the Q-register will be shifted into the O-register. If stage $2^7$ of the O-register is clear, and a "0" is desired to be set in that stage from the corresponding stage of the Q-register, then no signal will be sent from stage $2^7$ of the Q-register and that stage in the O-register will remain clear. However, if a "1" is desired to be set in that stage, the corresponding stage of the Q-register will be set, which will apply a signal on line 442 to the set side of stage $2^7$ in the O-register, thus setting a "1" in that stage. The same analysis applies for stages $2^2$ through $2^6$. However, the Marker bit is stored in stage $2^1$ of the O-register. Thus, if a "0" is desired to be applied to that stage from the corresponding stage in the Q-register, then stage $2^1$ must be cleared and, as shown in FIG. 13, if stage $2^1$ of the Q-register is clear, there will be an output on line 444 which when applied to the stage $2^1$ of the O-register in conjunction with the Q to O signal will cause stage $2^1$ to clear and a "0" will be established in that stage. If a "1" is desired to be placed in that stage, then no signal is sent from the Q-register and stage $2^1$ remains set. Stage $2^0$ of the O-register, however, may contain either a "1" or a "0," thus both sides of stage $2^0$ of the Q-register are connected to that stage in the O-register in order that if a "1" is stored in the O-register and it is desired to store a "0" in that register, then the corresponding stage in the Q-register will apply a signal on line 448 to clear the O-register. If a "0" is stored in stage $2^0$ of the O-register, and it is desired to store a "1" in that stage, then stage $2^0$ of the Q-register will be set and the output on line 446 will set stage $2^0$ of the O-register, thus storing a "1" in it.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A data transfer system comprising:
- a plurality of serial data word input sources,
- a plurality of communication line terminals arranged electrically in a matrix of rows and columns and connected to said sources for receiving said serial data word inputs, said rows and columns being arranged in preferential priority order,
- means in each terminal for generating a service request signal when a data word is received,
- means responsive to said request signal for selecting the highest priority terminal requesting service, said selecting means including means for selecting the highest priority row in which terminals are requesting service and inhibiting only all lower priority rows and means for selecting the highest priority column in which terminals are requesting service and inhibiting only all lower priority columns, and
- means connected to said terminals for accepting the data word from the terminal common to both the selected row and the selected column.

2. A data transfer system comprising:
a plurality of serial data word input sources, a plurality of communication line terminals arranged in priority order and connected to said sources for receiving said serial data word inputs,
said terminals including means for converting said serial data words to parallel data words,
signal generating means in each said terminal connected to said converter means for generating a signal when said parallel word has been formed in said converting means,
means connected to said terminals for simultaneously accepting said signals from all terminals,
means utilizing said accepted signals for selecting the terminal with the highest priority, and
means connected to said terminals for accepting said parallel data from said selected terminal only.

3. A data transfer system comprising:
a plurality of serial data word input sources,
a plurality of data transfer terminals connected to said sources and arranged in a priority order for receiving said serial data word inputs,
said terminals including means for converting said received serial data words to parallel data words,
signal generating means in each said terminal connected to said converting means for generating signals when said parallel word has been formed in said converting means,
means connected to said terminals for simultaneously accepting said signals from all terminals and selecting the terminal with the highest priority while inhibiting only those terminals of a lower priority and allowing higher priority terminals to communicate with said selecting means, and
means connected to said terminals for accepting said parallel data from said selected terminal.

4. A data transfer system comprising:
a plurality of serial data word input sources,
a plurality of communication line terminals connected to said sources and arranged in priority order groups for receiving said data inputs, said groups comprising individual ones of said terminals in priority order,
means in said terminals for generating a primary request signal when a complete data word has been received,
means connected to each group of said terminals for receiving and simultaneously examining all said primary request signals from the respective group and for generating a primary select signal for each said group of terminals in which a primary request occurs, said generating means connected to the highest priority group inhibiting the primary select signals generated for said lower priority groups,
means for transmitting the highest priority primary select signal to the highest priority group of said terminals,
means for using said primary select signal to select the highest priority terminal in said highest priority group, and
means for accepting the complete data word from said selected terminal.

5. A data transfer system as in claim 4 wherein said means for using said primary select signal comprises:
means for generating a secondary request signal in each of said terminals in the highest priority group only if both the primary request and primary select signals are present simultaneously in said terminal, and
means connected to said terminals for simultaneously examining all secondary request signals from the terminals in the highest priority group,
said last named means selecting and enabling only the highest priority terminal in the highest priority group and inhibiting all lower priority terminals.

6. A data transfer system for transferring data words from and to a data storage device, said system comprising:
a plurality of input and output communication line terminals arranged electrically in a priority order of rows and columns for receiving and transmitting data words respectively from and to said data storage device,
means in each of said terminals for generating a service request signal when attempting to communicate with said data storage device,
priority network means connected to said terminals for selecting the highest priority terminal generating service request signals and inhibiting only all lower priority terminals,
first means connected to said priority network means for utilizing said service request signals to provide input or output data request signals to said storage device which identify said selected terminal as an input or an output terminal, and
second means connected to said priority network means for utilizing said service request signals to establish a binary code identifying the selected terminal by row number and column number, and whereby
said storage device utilizes said input or output data request signals to cause reception or transmission of data respectively from or to said selected terminal, said binary code identifying the section of the storage device from which the data is to be taken or stored.

7. A priority selector network for a data transmission system comprising in combination:
first and second registers each including a plurality of bistable stages interconnected such that an output signal from one of said bistable stages precludes an output signal from all lower ordered stages,
a plurality of data transfer units electrically arranged in an array of rows and columns; each of the rows having a corresponding stage in said first register; each of the columns having a corresponding stage in said second register;
a data source connected to each said data transfer units,
a data receiving device connected to each said data transfer units,
means in said data transfer units in each row adapted to apply first request signals to the corresponding stage of said first register,
means in said data transfer units in each column responsive to the output from said one of said bistable stages of said first register produced upon receipt of said first request signal for applying second request signals to the corresponding stage of said second register;
gating means in said data transfer units responsive to the output of said one of said bistable stages in said second register produced upon receipt of said second request signals and to said output from said one of said bistable stages of said first register for controlling the transmission of data from said data source to one of said data receiving device through the data transfer unit corresponding to said one stage of said first and second registers.

8. The priority selector network for a data transmission system in claim 7 wherein said means for applying first request signals includes:
a shift register comprising first and second storage registers, each of said first and second registers consisting of a plurality of bistable stages,
means for serially applying a train of data pulses to a first one of said bistable stages in said second storage register,
means for shifting one of said serial data pulses from said first one of said bistable stages through all of said bistable stages of both storage registers,
means for producing a first request signal upon receipt of said one of said serial data pulses from the last bistable stage of said lower storage reigster, and
means for applying said request signal to the corresponding stage of said first register in said priority selector network.

9. A priority selector network as in claim 7 wherein said means for applying first request signals includes, a shift register comprising first and second storage registers, each of said first and second registers consisting of a plurality of bistable interconnected stages, detecting means connected to the output of predetermined ones of said stages of said first storage register for producing a first signal when each of said predetermined bistable stages is in a first state, said data source providing a second control signal to indicate its readiness to initiate a data transmission, said data receiving device producing a third control signal to indicate its readiness to receive data, and means connected to said detecting means said data source and said data receiving device for producing a first request signal when first, second and third control signals occur simultaneously.

10. The priority network in claim 7 wherein said means for applying first request signals includes means for receiving first and second synchronizing characters and a data word in sequential order, said second synchronizing character and said data word each being preceded by a marker bit, first detecting means coupled to said receiving means for generating first and second consecutive pulses respectively if said synchronizing characters are valid, second detecting means coupled to said receiving means for generating third and fourth consecutive pulses respectively when said marker bits are received, and means coupled to said first and second detection means for utilizing said pulses to produce a request signal.

11. The priority selector network in claim 7 wherein said means for applying first request signals includes:

a shift register comprising first and second interconnected registers, each of said first and second storage registers consisting of a plurality of bistable elements, detecting means connected to the output of predetermined ones of said elements of said second storage register for producing a first control signal when each of said predetermined bistable elements is in a first state, first, second and third bistable stages, means coupled to said detecting means and said first bistable stage for placing said first bistable stage in a first state when said detecting means produces said first control signal, said data source producing a second control signal, said data receiving device producing a third control signal, means coupled to said data source and said second bistable stage for placing said second bistable stage in a first state when said second control signal is received, means coupled to said third bistable stage, said second bistable stage and said data receiving device for placing said third bistable stage in a first state when said second bistable stage is placed in said first state and said data receiving device produces said third control signal, and means connected to said first and third bistable stages for producing a first request signal when said first and third bistable stages have been placed in said first state.

12. A priority selector network as in claim 8 wherein said means for applying said second request signals includes:

gate means responsive to said first request signal and said output from said one of said bistable stages of said first register for producing said second request signal.

13. A priority selector network as in claim 9 wherein said means for applying said second request signals includes:

gate means responsive to said first request signal and said output from said one of said bistable stages of said first register for producing said second request signal.

14. A priority selector network in claim 10 wherein said means for applying said second request signals includes:

gate means responsive to said first request signal and said output from said one of said bistable stages of said first register for producing said second request signal.

15. A priority selector network as in claim 11 wherein said means for applying said second request signals includes:

gate means responsive to said first request signal and said output from said one of said bistable stages of said first register for producing said second request signal.

16 A priority selector network for causing one of a plurality of data transfer means requesting service to transfer data from one device to another, said network comprising $n^2$ data transfer means, $U_{ij}$, where $i=0 \ldots n$ and $j=0 \ldots n$, $n$ primary selecting means, $P_i$, each $P_a$ coupled to $U_{aj}$, for selecting the highest priority $U_{aj}$, where $0 \leq a \leq n$, and $n$ secondary selecting means, $S_j$, each $S_b$ coupled to $U_{ib}$ for selecting the highest priority $U_{ib}$, where $0 \leq b \leq n$, only said selected data transfer means, $U_{ab}$, transferring said data.

17. A priority selector network comprising:

a plurality of data transfer means arranged electrically in rows and columns of priority preference, signal generating means in each of said transfer means for producing service request signals, said request signals being produced when data is present if the device is an input data transfer means and said request signals being produced when said data transfer means is capable of receiving data if it is an output data transfer means, means for utilizing said request signals to select the highest priority row in which a request signal occurs, means for utilizing said request signals to select the highest priority column in the selected row in which a request signal occurs, and means for accepting data only from said transfer means common to both said selected row and selected column.

18. A serial-to-parallel converter comprising:

a clock producing a plurality of pulses of first and second phases, $n$ bistable storage devices arranged in a lower rank, $n-1$ bistable storage devices arranged in an upper rank, a source of serial input data pulses forming data words connected to said clock and to a first lower rank storage device, a start pulse preceding each of said words, said start pulse starting said clock, said clock causing said start pulse to be stored in a first bistable storage device in said lower rank, means for shifting said start bit and said data pulses through said storage devices, said shifting means including, means for causing the contents of said lower rank storage devices to be transferred to said upper rank storage devices on one of said first phase pulses of said clock, means for causing the lower rank of storage devices to shift the contents of the upper rank one bit position and to store said shifted content in said lower rank on said second phase pulse of said clock, said shifting continuing until said first input data bit is stored in the $n$th storage device of the lower rank, and means for receiving the output of said $n$th storage device for stopping said clock.

19. A serial-to-parallel converter comprising:

a first rank of $n$ storage devices, a second rank $n-1$ of storage devices, serial input data words $n$-bits in length connected to a first storage device of said first rank for temporary storing, means for transferring the contents of said first rank of storage devices to the corresponding storage devices of said second rank, means for shifting the contents of said second rank one bit position and storing said shifted contents in said first rank storage devices, and means for receiving in parallel the contents of $n-1$ first rank storage devices when said data bits are stored in all $n$ storage devices.

20. A parallel-to-serial converter comprising:

first and second registers having $n$ bistable stages, means for applying parallel data word bits to $n-1$ stages of said first register, means for applying a marker bit to the $n$th stage of said first register, means for transferring the bits in said $n$ stages in said first register to corresponding stages of said second register, means for accepting bits serially from the first stage of said second register, means for shifting each bit in $n-1$ stages of said second register one bit position and transferring said shifted bits to corresponding stages of said first register, detecting means connected to the output of $n-1$ stages of said first register for producing a pulse when said marker bit is no longer in any of said $n-1$ stages of said first register, and means for causing said transferring and said shifting of said bits to continue until said pulse is received from said detecting means.

21. A parallel-to-serial converter comprising:

a shift register of $n+1$ bistable storage elements, means for applying $n$ data bits and a marker bit in parallel to said $n+1$ storage elements, means for shifting said data bits followed by said marker bits through said storage elements, means for serially detecting the shifted bits at the output of the $n$th storage element, detecting means connected to the output of $n-1$ elements for producing a pulse when said marker bit is no longer in any of said $n-1$ storage elements, and means for stopping the shifting of said bits when said pulse is produced by said detecting means.

22. A priority selector network for causing one of a plurality of data transfer means requesting service to transfer data from one device to another, said network comprising: a plurality of data transfer means for transmitting data signals, each of said data transfer means having primary and secondary predetermined priority levels; primary selecting means coupled to first predetermined groups of said data transfer means for selecting the one of said data transfer means having the highest primary priority level, and including first circuit means for providing signals indicative of said first selection; and secondary selecting means coupled to second predetermined groups of data transfer means, where at least one of said data transfer means in each of said first groups is common to an associated one of said second groups said secondary selecting means for selecting the one of said data transfer means having the highest secondary priority level, and including second circuit means for providing signals indicative of said second selection; whereby only the one of said data transfer means having said selected primary and secondary priority levels is enabled for transferring data.

23. A priority selector network for causing one of a plurality of data transfer means requesting service to transfer data from one device to another, said network comprising: $mn$ data transfer means, designated $U_{ij}$, where $i=0 \ldots m$, and $j=0 \ldots n$; $m$ primary selecting means, designated $P_i$, each $P_a$ coupled to $U_{aj}$, for selecting the highest priority $U_{aj}$ where $a$ is an integer in the range $0 \leq a \leq m$; and $n$ secondary selecting means, designated $S_j$, each $S_b$ coupled $U_{ib}$ for selecting the highest priority $U_{ib}$, where $b$ is an integer in the range $0 \leq b \leq n$, only the selected one of said data transfer means $U_{ab}$ being enabled to transfer said data.

References Cited

UNITED STATES PATENTS 2,992,416 7/1961 Sims -------------- 340—174

ROBERT C. BAILEY, *Primary Examiner.*

R. M. RICKERT, *Assistant Examiner.*

UNITED STATES PATENT OFFICE
CERTIFICATE OF CORRECTION

Patent No. 3,331,055 July 11, 1967

Allen D. Betz et al.

It is hereby certified that error appears in the above numbered patent requiring correction and that the said Letters Patent should read as corrected below.

Column 3, line 57, for "single/output" read -- single input/output --; line 35, for "statge" read -- stage --; column 8, line 12, after "CLT's", first occurrence, insert -- and 32 output CLT's --; line 62, for "bias" read -- bits --; column 9, line 4, for "than" read -- that --; column 10, line 51, for "PRR", first and second occurrence, read -- PPR --; column 11, line 21, for "PR" read -- PPR --; line 27, for "PRR" read -- PPR --; line 70, after "used" insert -- which --; column 12, line 6, for "S" read -- SS --; line 45, for "$2_0$-$2^5$" read -- $2^0$-$2^5$ --; column 13, line 48 strike out "in", first occurrence; column 14, line 49, for "113" read -- 223 --; column 15, line 14, after "register", first occurrence, insert -- and --; line 17, after "the" insert -- I --; column 17, line 13, after "transferred" insert -- to the corresponding flip-flop in the upper register. On the next $\phi 2$ pulse the first data signal is transferred --; column 18, line 26, for "stages", second occurrence, read -- stage --; column 19, line 70, for "mesasge" read -- message --; column 20, line 13, after "the" second occurrence, insert -- Input --; line 22, for "S04" read -- 304 --; column 21, line 52, strike out "has", first occurrence; column 24, line 27, after "430" insert -- preventing --; column 25, line 48, for "is" read -- in --; line 56, for "he" read -- the --; column 28, line 21, strike out ", and"; line 56, strike out "one of"; column 29, line 7, for "bistable interconnected" read -- interconnected bistable --; line 19, after "when" insert -- said --; line 39, before "registers" insert -- storage --.

Signed and sealed this 24th day of September 1968.

(SEAL)
Attest:

EDWARD M.FLETCHER, JR.
Attesting Officer

EDWARD J. BRENNER
Commissioner of Patents